（12） United States Patent
Nakano et al.

(10) Patent No.: US 9,800,100 B2
(45) Date of Patent: Oct. 24, 2017

(54) PERMANENT MAGNET MOTOR AND DRIVING APPARATUS-INTEGRATED PERMANENT MAGNET MOTOR

(71) Applicant: MITSUBISHI ELECTRIC CORPORATION, Chiyoda-ku (JP)

(72) Inventors: Masatsugu Nakano, Chiyoda-ku (JP); Yu Hirotani, Chiyoda-ku (JP); Hiroko Ueyama, Chiyoda-ku (JP); Ryuichi Takiguchi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/311,786

(22) PCT Filed: Apr. 28, 2015

(86) PCT No.: PCT/JP2015/062825
§ 371 (c)(1),
(2) Date: Nov. 16, 2016

(87) PCT Pub. No.: WO2015/186455
PCT Pub. Date: Dec. 10, 2015

(65) Prior Publication Data
US 2017/0085138 A1    Mar. 23, 2017

(30) Foreign Application Priority Data

Jun. 6, 2014  (JP) .................................. 2014-118066

(51) Int. Cl.
*H02K 1/16* (2006.01)
*H02K 1/18* (2006.01)
(Continued)

(52) U.S. Cl.
CPC ................. *H02K 1/16* (2013.01); *H02K 1/14* (2013.01); *H02K 1/18* (2013.01); *H02K 1/27* (2013.01);
(Continued)

(58) Field of Classification Search
CPC ............................. H02K 1/12; H02K 2313/03
(Continued)

(56) References Cited

U.S. PATENT DOCUMENTS

2003/0201681 A1   10/2003  Shimizu et al.
2004/0021393 A1*   2/2004  Suzuki ................... H02K 1/148
                                                                    310/216.012
(Continued)

FOREIGN PATENT DOCUMENTS

JP          6-54468 A     2/1994
JP          8-214514 A    8/1996
(Continued)

OTHER PUBLICATIONS

Decision of Allowance dated Apr. 22, 2016 in Japanese Patent Application No. 2015-545214 (with English Translation).
(Continued)

*Primary Examiner* — Thomas Truong
(74) *Attorney, Agent, or Firm* — Oblon, McClelland, Maier & Neustadt, L.L.P.

(57) ABSTRACT

A permanent magnet motor includes: a stator including: a stator core in which teeth are respectively arranged circumferentially so as to protrude radially inward from an annular core back; an armature winding that is mounted to the stator core; and a frame that holds the stator core in an internally fitted state; and a rotor that includes a rotor core and permanent magnets, the armature winding being constituted by a plurality of coils that are respectively wound so as to be concentrated on the teeth, wherein: inner circumferential (Continued)

ends of adjacent teeth are connected together by a connecting portion; and $0.122 \leq (t2+t3)/r4 \leq 0.202$ is satisfied, where t2 is a thickness of the core back, t3 is a thickness of the frame, and r4 is an outside radius of the frame.

18 Claims, 24 Drawing Sheets

(51) Int. Cl.
　　　*H02K 1/27*　　　(2006.01)
　　　*H02K 11/00*　　(2016.01)
　　　*H02K 15/02*　　(2006.01)
　　　*H02K 1/14*　　　(2006.01)
　　　*H02K 11/33*　　(2016.01)
(52) U.S. Cl.
　　　CPC .......... *H02K 11/33* (2016.01); *H02K 15/026* (2013.01); *H02K 2213/03* (2013.01)
(58) Field of Classification Search
　　　USPC ............................................. 310/216.097, 89
　　　See application file for complete search history.

(56) References Cited

U.S. PATENT DOCUMENTS

| 2010/0295387 | A1 | 11/2010 | Ueta et al. | |
|---|---|---|---|---|
| 2013/0002058 | A1* | 1/2013 | McIntosh | H02K 1/185 310/43 |
| 2014/0145547 | A1* | 5/2014 | Nakano | H02K 21/16 310/216.069 |

FOREIGN PATENT DOCUMENTS

| JP | 8-266013 A | 10/1996 | |
|---|---|---|---|
| JP | 2000-245124 A | 9/2000 | |
| JP | 2000-341889 A | 12/2000 | |
| JP | 2003-88011 A | 3/2003 | |
| JP | 2003-264947 A | 9/2003 | |
| JP | 2003-324867 A | 11/2003 | |
| JP | 2004-64925 A | 2/2004 | |
| JP | 2006-211820 A | 8/2006 | |
| JP | 2006-288042 A | 10/2006 | |
| JP | 2009-201235 A | 9/2009 | |
| JP | 2010-284024 A | 12/2010 | |
| JP | 2011-30303 A | 2/2011 | |
| JP | 2011-182642 A | 9/2011 | |
| JP | WO 2013054439 A1 * | 4/2013 | ............. H02K 21/16 |
| JP | 2013-192359 A | 9/2013 | |
| JP | 2014-75866 A | 4/2014 | |
| WO | 00/72426 A1 | 11/2000 | |
| WO | 2008/050637 A1 | 5/2008 | |
| WO | 2013/054439 A1 | 4/2013 | |

OTHER PUBLICATIONS

International Search Report dated Aug. 4, 2015 in PCT/JP2015/062825 filed Apr. 28, 2015.

Notification of Reason(s) for Refusal dated Dec. 22, 2016 in Japanese Patent Application No. 2015-545214 (with English Translation).

* cited by examiner

ANGLE OF ROTATION (DEGREES)
ELECTRICAL ANGLE

PERMANENT MAGNET MOTOR AND DRIVING APPARATUS-INTEGRATED PERMANENT MAGNET MOTOR

TECHNICAL FIELD

The present invention relates to a permanent magnet motor and a driving apparatus-integrated permanent magnet motor that can be used in an automotive electric power steering apparatus, for example, and particularly relates to a stator construction that can suppress reductions in rigidity and increase slot cross-sectional area.

BACKGROUND ART

In Patent Literature 1, a "concentrated-winding motor" is disclosed, in which in which conductor wire is wound so as to be concentrated on stator core teeth.

In Patent Literature 2, a distributed-winding motor is disclosed that is integrated with a driving apparatus that is used in a electric power steering apparatus.

CITATION LIST

Patent Literature

Patent Literature 1: International Publication No. WO/2008/050637
Patent Literature 2: Japanese Patent Laid-Open No. 2013-192359 (Gazette)

SUMMARY OF THE INVENTION

Problem to be Solved by the Invention

In Patent Literature 1, because the armature winding is a concentrated winding, coil ends are smaller, and armature winding resistance is also reduced, making it advantageous for reductions in size and increases in output. However, because inner circumferential ends of adjacent teeth are not connected, rigidity of the teeth is reduced. Thus, one problem has been that vibration of the teeth increases if the armature magnetomotive force is increased, and as a result vibration of a core back and a frame is increased, increasing vibration noise.

In Patent Literature 2, because bridge portions that connect together inner circumferential ends of adjacent teeth are disposed, rigidity of the teeth is raised, enabling vibration noise to be reduced. However, because the armature winding is a distributed winding, the coil ends are larger, and armature resistance is also increased, making it disadvantageous for reductions in size and increases in output.

However, in Cited Literature 1 and 2, no mention has been made of radial thicknesses of the core back and the frame of the stator core.

The present applicants have observed that: (1) it is necessary to reduce the resistance of the armature winding, and to increase slot cross-sectional area in order to increase output; (2) it is necessary to reduce the radial thickness of the core back in order to increase the slot cross-sectional area while ensuring motor output, but rigidity of the stator core decreases, and vibration noise due to electromagnetic vibrational forces increases; and (3) it is necessary to reduce the radial thickness of the frame that holds the stator core in an internally fitted state in order to reduce the size of the motor, but frame rigidity similarly decreases, and vibration noise due to electromagnetic vibrational forces increases, and have succeeded in inventing the present invention by investigating a radial thickness of the core back of the stator core and a radial thickness and outside diameter of the frame from a viewpoint of reconciliation of reductions in size and increases in output with reductions in vibration and noise.

The present invention aims to solve the above problems and an object of the present invention is to provide a permanent magnet motor and a driving apparatus-integrated permanent magnet motor that can achieve reconciliation of reductions in size and increases in output with reductions in vibration and noise.

Means for Solving the Problem

A permanent magnet motor according to the present invention includes: a stator including: a stator core in which teeth are respectively arranged circumferentially so as to protrude radially inward from an annular core back; an armature winding that is mounted to the stator core; and a frame that holds the stator core in an internally fitted state; and a rotor that includes a rotor core and permanent magnets. The armature winding is constituted by a plurality of coils that are respectively wound so as to be concentrated on the teeth, and inner circumferential ends of adjacent teeth are connected together by a connecting portion. $0.122 \leq (t2+t3)/r4 \leq 0.202$ is satisfied, where t2 is a thickness of the core back, t3 is a thickness of the frame, and r4 is an outside radius of the frame.

Effects of the Invention

According to the present invention, because the inner circumferential ends of the adjacent teeth are connected together by the connecting portion, and $0.122 \leq (t2+t3)/r4 \leq 0.202$ is satisfied, where t2 is the thickness of the core back, t3 is the thickness of the frame, and r4 is the outside radius of the frame, reductions in vibration and noise can be reconciled with reductions in size and increases in output in the permanent magnet motor.

DESCRIPTION OF THE PREFERRED EMBODIMENTS

Figure 32:
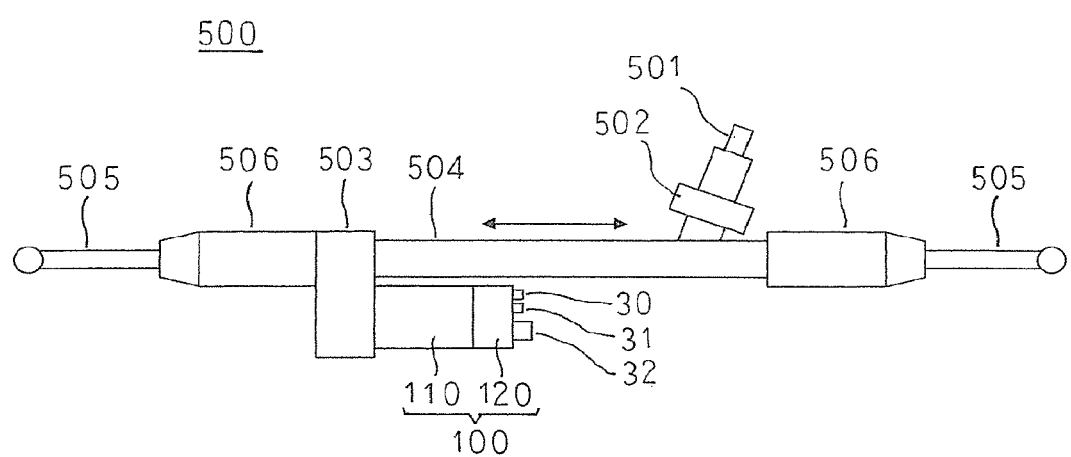
FIG. 32 is an explanatory diagram for an automobile electric power steering apparatus according to the present invention.

Before describing the embodiments, an automobile electric power steering apparatus to which a driving apparatus-integrated permanent magnet motor according to the present invention is mounted will first be explained with reference to FIG. 32. Moreover, FIG. 32 is an explanatory diagram for an automobile electric power steering apparatus according to the present invention.

When a driver steers a steering wheel (not shown), torque therefrom is transmitted to a shaft 501 by means of a steering column (not shown). Here, the torque that is transmitted to the shaft 501 is detected by a torque sensor 502, and is converted into electrical signals, which are transmitted through cables (not shown) to an electronic control unit (ECU) portion 120 by means of a first connector 30 of a driving apparatus-integrated permanent magnet motor 100. At the same time, vehicle information such as vehicle speed is converted to electrical signals, which are transmitted to the ECU portion 120 by means of a second connector 31. The ECU portion 120 computes the required assisting torque from that torque and the vehicle information such as the vehicle speed, and supplies electric current to a permanent magnet motor 110 through an inverter.

The permanent magnet motor 110 is disposed such that a central axis is oriented parallel to a direction of movement (indicated by arrows) of a rack shaft. Electric power supply to the ECU portion 120 is fed by means of an electric power supply connector 32 from a battery or an alternator. Torque that is generated by the permanent magnet motor 110 is reduced by a gear box 503 into which belts (not shown) and ball screws (not shown) are mounted internally, to generate thrust that moves the rack shaft (not shown) that is inside the housing 504 in the direction of the arrows to assist the steering force of the driver. Thus, tie rods 505 move, enabling the tires to be steered and the vehicle turned. The driver is thereby assisted by the torque from the permanent magnet motor 110, enabling the vehicle to be turned using less steering force. Moreover, a rack boot 506 is disposed so as to prevent foreign matter from entering the apparatus.

In an electric power steering apparatus 500 of this kind, it is desirable for the driving apparatus-integrated permanent magnet motor 100 to be compact and have high output from viewpoints of vehicle mountability and improvements in fuel economy. In addition, it is desirable for the driving apparatus-integrated permanent magnet motor 100 to be low in vibration and noise from a viewpoint of driver comfort.

Embodiment 1

Figure 1:
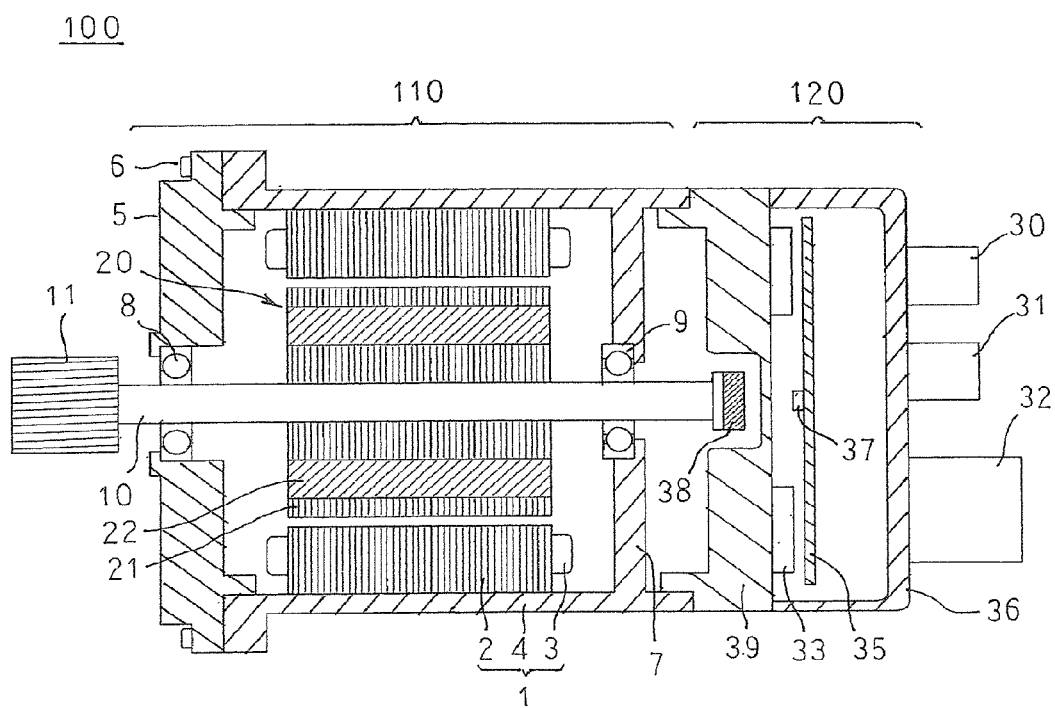
FIG. 1 is a longitudinal cross section that shows a driving apparatus-integrated permanent magnet motor according to Embodiment 1 of the present invention.

FIG. 1 is a longitudinal cross section that shows a driving apparatus-integrated permanent magnet motor according to Embodiment 1 of the present invention. Moreover, a "longitudinal cross section" is a cross section in a plane that includes a central axis of the driving apparatus-integrated permanent magnet motor.

In FIG. 1, a driving apparatus-integrated permanent magnet motor 100 has an integrated construction in which a permanent magnet motor 110 that functions as a motor portion and an electronic control unit (ECU) portion 120 that functions as a driving apparatus are disposed in an axial direction of a rotating shaft of the permanent magnet motor 110. Since the permanent magnet motor 110 and the ECU portion 120 are disposed in an axial direction of the rotating shaft of the permanent magnet motor 110, and have an integrated construction, the following effects can be achieved. First, because lengths of wiring between the permanent magnet motor 110 and the ECU portion 120 can be made shorter, noise and loss that occurs in the wiring between the permanent magnet motor 110 and the ECU portion 120 can be reduced. In addition, because axial length of the driving apparatus-integrated permanent magnet motor 100 can be reduced, reductions in the size of the driving apparatus-integrated permanent magnet motor 100 can be achieved.

The permanent magnet motor 110 includes: a stator 1 that has: an annular stator core 2 that is configured by laminating electromagnetic steel sheets; an armature winding 3 that is housed in the stator core 2; and a frame 4 that fixes the stator core 2; and a rotor 20 that is rotatably disposed inside the stator 1.

The frame 4 is produced so as to have a cylindrical shape using a satisfactorily thermally conductive material such as aluminum, or an aluminum alloy such as ADC12, for example, and holds the stator core 2 in an internally fitted state by press-fitting or shrinkage fitting, etc. A disk-shaped housing 5 is fixed to a first axial end surface of the frame 4 by fastening using screws 6. A bearing fixing portion 7 is also disposed integrally with the frame 4, or separately, so as to protrude radially inward from a vicinity of a second axial end of the frame 4. A shaft 10 is rotatably supported in the first bearing 8 and the second bearing 9. A pulley 11 is press-fitted onto a vicinity of a first axial end, that is, an output shaft end, of the shaft 10, and functions to transmit driving force to the belts of the electric power steering apparatus 500. Moreover, depending on the configuration of the electric power steering apparatus 500, the driving force may be transmitted to gears instead of the belts. In that case, a coupling must be press-fitted onto the shaft 10 instead of the pulley 11. A rotation sensor permanent magnet 38 is disposed on a second axial end portion of the shaft 10.

The rotor 20 includes: a rotor core 21 that is fixed to the shaft 10 by press-fitting; and permanent magnets 22 that are fixed to the rotor core 21. Moreover, in FIG. 1, the permanent magnets 22 are fixed inside the rotor core 21, but the permanent magnets 22 may alternatively be fixed to a surface of the rotor core 21, as described in detail below.

Figure 2:
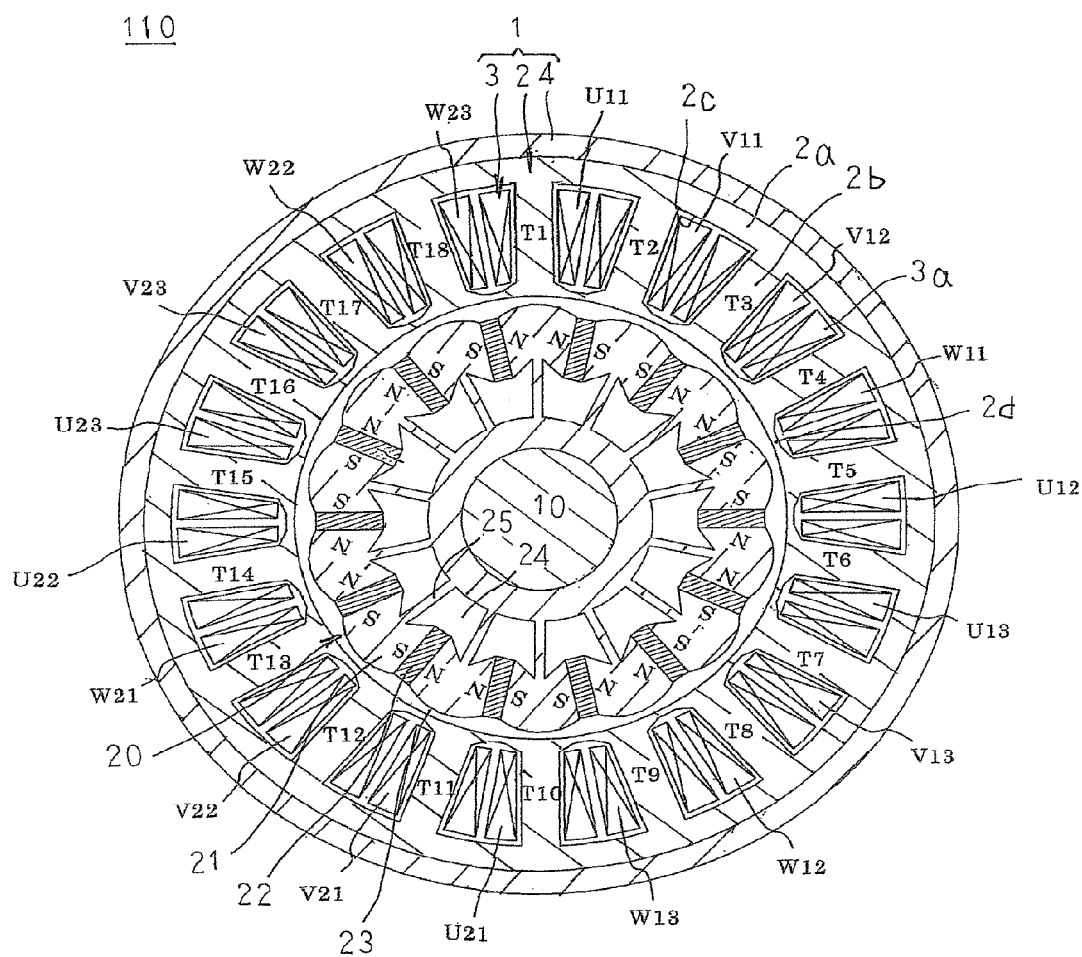
FIG. 2 is a lateral cross section that shows the permanent magnet motor according to Embodiment 1 of the present invention.

Next, a configuration of the stator 1 will be explained with reference to FIG. 2. FIG. 2 is a lateral cross section that shows the permanent magnet motor according to Embodiment 1 of the present invention. Moreover, a "lateral cross section" is a cross section in a plane that that is perpendicular to the central axis of the permanent magnet motor.

The stator 1 includes: a stator core 2 that has: an annular core back 2a; eighteen teeth 2b that extend radially inward from the core back 2a; and a connecting portion 2d that links together tip end portions of adjacent teeth 2b; an armature winding 3 that includes eighteen coils 3a that are wound so as to be concentrated on each of the teeth 2b; and a frame 4 that holds the stator core 2 in an internally fitted state. Thus, the slot 2c is formed between the adjacent teeth 2b.

In a cross section of the stator core 2 that is perpendicular to the central axis, because an outer circumferential surface of the core back 2a is a circle that is centered around the central axis, and an inner circumferential surface is a circular arc that is centered around the central axis, slot cross-sectional area can be increased while increasing a radial width of the core back 2a compared to when an inner circumferential surface of the core back is constituted by straight lines. Thus, because the inner circumferential surface of the core back 2a is a circular arc shape, the radial width of the core back 2a can be enlarged compared to when the inner circumferential surface of the core back is constituted by rectilinear shapes, enabling magnetic saturation to be alleviated and increased torque to be achieved. In addition, because the inner circumferential surface of the core back 2a is a circular arc shape, slot cross-sectional area can be enlarged compared to when the inner circumferential surface of the core back is constituted by rectilinear shapes, and because the cross-sectional area of the armature winding 3 can be increased, reductions in copper loss and increases in output of the motor are enabled.

Moreover, in FIG. 2, insulators that are disposed between the armature winding 3 and the stator core 2 have been omitted for simplicity. Numbering T1 through T18 has also been allotted to the teeth 2b in order of circumferential arrangement for simplicity. Numbers are additionally applied to the coils 3a that are wound so as to be concentrated on each of the teeth 2b as an expedient so as to represent and identify which coil belongs to which phase among a U phase, a V phase, and a W phase. The U phase is constituted by six coils 3a, i.e., U11, U12, U13, U21, U22, and U23, the V phase is constituted by six coils 3a, i.e., V11, V12, V13, V21, V22, and V23, and the W phase is constituted by six coils 3a, i.e., W11, W12, W13, W21, W22, and W23. As shown in FIG. 2, the eighteen coils 3a line up sequentially in order of U11, V11, V12, W11, U12, U13, V13, W12, W13, U21, V21, V22, W21, U22, U23, V23, W22, and W23 so as to correspond to each of the teeth T1 through T18.

Figure 3:
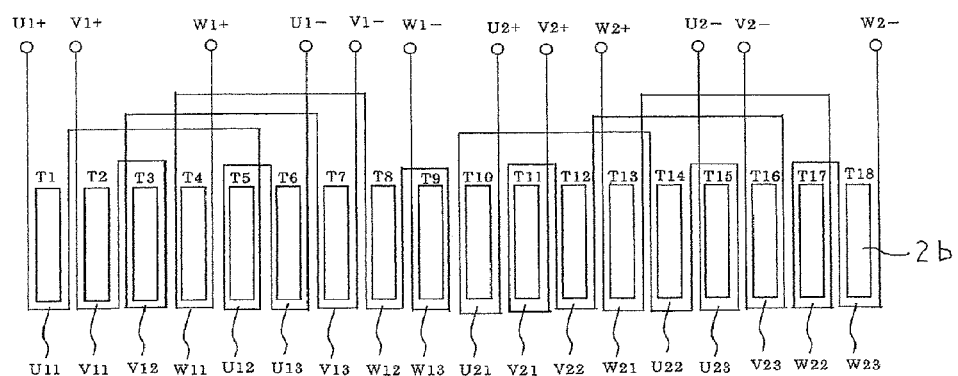
FIG. 3 is a schematic diagram that explains a first method for connecting an armature winding in the permanent magnet motor according to Embodiment 1 of the present invention.

Next, a first method for connecting the eighteen coils 3a will be explained with reference to FIG. 3. FIG. 3 is a schematic diagram that explains a first method for connecting an armature winding in the permanent magnet motor according to Embodiment 1 of the present invention. In FIG. 3, eighteen quadrangular shapes that are lined up in a row represent the teeth 2b from T1 through T18, and the coils 3a that are wound onto each of the teeth 2b are indicated by U11, V11, V12, W11, U12, U13, V13, W12, W13, U21, V21, V22, W21, U22, U23, V23, W22, and W23.

U11, U12, and U13 are connected in series to constitute a U1 phase which is a first U-phase winding. Here, a coil winding direction of U12 is opposite to those of U11 and U13. U21, U22, and U23 are connected in series to constitute a U2 phase which is a second U-phase winding. Here, a coil winding direction of U22 is opposite to those of U21 and U23. V11, V12, and V13 are connected in series to constitute a V1 phase which is a first V-phase winding. Here, a coil winding direction of V12 is opposite to those of V11 and V13. V21, V22, and V23 are connected in series to constitute a V2 phase which is a second V-phase winding. Here, a coil winding direction of V22 is opposite to those of V21 and V23. W11, W12, and W13 are connected in series to constitute a W1 phase which is a first W-phase winding. Here, a coil winding direction of W12 is opposite to those of W11 and W13. W21, W22, and W23 are connected in series to constitute a W2 phase which is a second W-phase winding. Here, a coil winding direction of W22 is opposite to those of W21 and W23.

The U1 phase has two ends, i.e., a U11 end being U1+, and a U13 end being U1−, and the U2 phase similarly also has two ends, i.e., a U21 end being U2+, and a U23 end being U2−. The V1 phase similarly has two ends, i.e., a V11 end being V1+, and a V13 end being V1−, and the V2 phase similarly also has two ends, i.e., a V21 end being V2+, and a V23 end being V2−. The W1 phase similarly has two ends, i.e., a W11 end being W1+, and a W13 end being W1−, and the W2 phase similarly also has two ends, i.e., a W21 end being W2+, and a W23 end being W2−.

Figure 5:
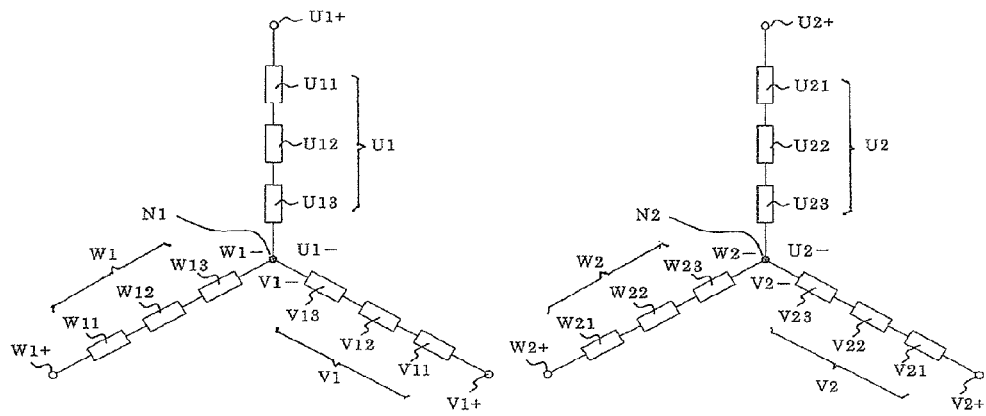
FIG. 5 is a wye connection diagram for the armature winding in the permanent magnet motor according to Embodiment 1 of the present invention.
Figure 6:
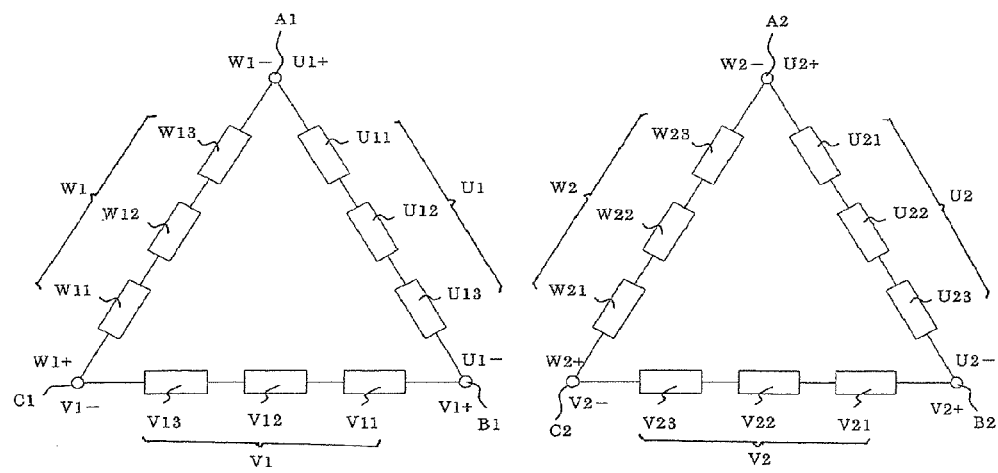
FIG. 6 is a delta connection diagram for the armature winding in the permanent magnet motor according to Embodiment 1 of the present invention.

Here, as shown in FIGS. 5 and 6, the armature winding 3 is configured by alternating-current connecting the U1 phase, the U2 phase, the V1 phase, the V2 phase, the W1 phase, and the W2 phase that have been configured in this manner. FIG. 5 is a wye connection diagram for the armature winding in the permanent magnet motor according to Embodiment 1 of the present invention, and FIG. 6 is a delta connection diagram for the armature winding in the permanent magnet motor according to Embodiment 1 of the present invention.

First, as shown in FIG. 5, U1−, V1−, and W1− are electrically connected to configure a first armature winding that is formed by wye-connecting the U1 phase, the V1 phase, and the W1 phase. The connected portion at U1−, V1−, and W1− becomes the neutral point N1 of the first armature winding. U2−, V2−, and W2− are electrically connected to configure a second armature winding that is formed by wye-connecting the U2 phase, the V2 phase, and the W2 phase. The connected portion at U2−, V2−, and W2− becomes the neutral point N2 of the second armature winding. Thus, the armature winding 3 is constituted by the first and second armature windings, which are each wye-connected.

Alternatively, as shown in FIG. 6, A1 is formed by connecting U1+ and W1−, B1 is formed by connecting V1+ and U1−, and C1 is formed by connecting W1+ and V1− to configure a first armature winding that is formed by delta-connecting the U1 phase, the V1 phase, and the W1 phase. A2 is formed by connecting U2+ and W2−, B2 is formed by connecting V2+ and U2−, and C2 is formed by connecting W2+ and V2− to configure a second armature winding that is formed by delta-connecting the U2 phase, the V2 phase, and the W2 phase. Thus, the armature winding 3 is constituted by the first and second armature windings, which are each delta-connected. In that case, because the induced voltage in the coils 3a is √3 times greater when delta-connected than when wye-connected, the number of turns can be made approximately √3 times greater than when wye-connected. The wire diameter of the coils 3a can thereby be reduced, improving winding space factor at the same time as workability is improved, and enabling copper loss to be reduced, thereby leading to high efficiency.

Figure 4:
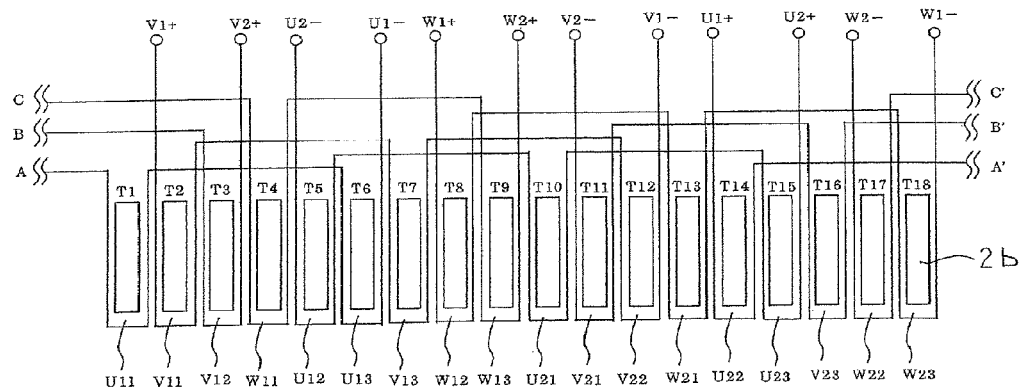
FIG. 4 is a schematic diagram that explains a second method for connecting the armature winding in the permanent magnet motor according to Embodiment 1 of the present invention.

Next, a second method for connecting the eighteen coils 3a will be explained with reference to FIG. 4. FIG. 4 is a schematic diagram that explains a second method for connecting the armature winding in the permanent magnet motor according to Embodiment 1 of the present invention. In FIG. 4, eighteen quadrangular shapes that are lined up in a row represent the teeth 2b from T1 through T18, and the coils 3a that are wound onto each of the teeth 2b are indicated by U11, V11, V12, W11, U12, U13, V13, W12, W13, U21, V21, V22, W21, U22, U23, V23, W22, and W23.

U22, U11, and U13 are connected in series to constitute a U1 phase which is a first U-phase winding. Here, coil winding directions of U22, U11, and U13 are identical. V11, V13, and V22 are connected in series to constitute a V1 phase which is a first V-phase winding. Here, coil winding directions of V11, V13, and V22 are identical. W12, W21, and W23 are connected in series to constitute a W1 phase which is a first W-phase winding. Here, coil winding directions of W12, W21, and W23 are identical. U23, U21, and U12 are connected in series to constitute a U2 phase which is a second U-phase winding. Here, coil winding directions of U23, U21, and U12 are identical. V12, V23, and V21 are connected in series to constitute a V2 phase which is a second V-phase winding. Here, coil winding directions of V12, V23, and V21 are identical. W13, W11, and W22 are connected in series to constitute a W2 phase which is a second W-phase winding. Here, coil winding directions of W13, W11, and W22 are identical.

The U1 phase has two ends, i.e., a U22 end being U1+, and a U13 end being U1−, and the U2 phase similarly also has two ends, i.e., a U23 end being U2+, and a U12 end being U2−. The V1 phase similarly has two ends, i.e., a V11 end being V1+, and a V22 end being V1−, and the V2 phase similarly also has two ends, i.e., a 12 end being V2+, and a V21 end being V2−. The W1 phase similarly has two ends, i.e., a W12 end being W1+, and a W23 end being W1−, and the W2 phase similarly also has two ends, i.e., a W13 end being W2+, and a W22 end being W2−.

The U1 phase, the U2 phase, the V1 phase, the V2 phase, the W1 phase, and the W2 phase that are configured in this manner are configured into armature windings by being wye-connected or delta-connected in a similar manner to the U1 phase, the U2 phase, the V1 phase, the V2 phase, the W1 phase, and the W2 phase that are configured using the first connecting method that is shown in FIG. 3.

Next, a configuration of the rotor 20 will be explained.

The rotor 20 is configured such that fourteen permanent magnets 22 are embedded in the rotor core 21. In other words, the number of poles in the rotor 20 is fourteen. The permanent magnets 22 are produced into strip-shaped bodies that have rectangular cross sections in each of which a length in a radial direction thereof is longer than a length in a circumferential direction, and are arranged at a uniform pitch circumferentially. As shown in FIG. 2, the permanent magnets 22 are magnetized so as to have directions of magnetization such that N and S are North-seeking (N) poles and South-seeking (S) poles, respectively. In other words, facing surfaces of adjacent permanent magnets 22 are magnetized so as to be mutually identical poles. By adopting such directions of magnetization, magnetic flux can be concentrated in the rotor core 21, increasing magnetic flux density, and enabling effects to be obtained such as achieving increased torque.

The rotor core 21 is interposed between the adjacent permanent magnets 22. The portions of the rotor core 21 that are positioned between the adjacent permanent magnets 22 are formed into curved surface portions 23 that have curved surfaces that have a radially outwardly convex shape such that an air gap length from the stator 1 is shorter at a halfway point between the adjacent permanent magnets 22. Because the waveform of the magnetic flux density that is generated in the air gap formed with the stator 1 can be smoothed by adopting such a shape, cogging torque and torque ripples can be reduced.

Nonmagnetic portions 24 are disposed so as to contact end surfaces on radially inner sides of the permanent magnets 22. Here, penetrating apertures are formed so as to pass axially through portions on the radially inner sides of the permanent magnets 22 of the rotor core 21 to constitute the nonmagnetic portions 24 using air, but nonmagnetic portions 24 may be formed by filling the penetrating apertures with a resin, or nonmagnetic portions 24 may be formed by inserting a nonmagnetic metal such as a stainless alloy or aluminum into the penetrating apertures. Magnetic leakage flux from the permanent magnets 22 can be reduced by disposing the nonmagnetic portions 24 in this manner. In addition, linking portions 25 are disposed between portions of the rotor core 21 between the adjacent permanent magnets 22 and a portion of the rotor core 21 that is disposed so as to surround the outer circumference of the shaft 10 such that each portion of the rotor core 21 is firmly linked mechanically.

Next, the ECU portion 120 will be explained.

As shown in FIG. 1, disposed in the ECU portion 120 are: a first connector 30 that receives the signals from the torque sensor 502; a second connector 31 that receives vehicle information such as vehicle speed; and an electric power supply connector 32 for electric power supply.

In addition, there is an inverter circuit for driving the permanent magnet motor 110 in the ECU portion 120, and the inverter circuit has switching elements 33 such as metal oxide semiconductor field-effect transistors (MOSFETs). Configurations in which bare chips are mounted to direct bonded copper (DBC) circuit boards or configurations in which bare chips are molded using a resin to form power modules, for example, are conceivable for these switching elements 33. The switching elements 33 generate heat because electric current for driving the motor flows therethrough. Thus, the switching elements 33 have a construction in which heat is radiated by being placed in contact with a heatsink 39 so as to have an adhesive or insulating sheets interposed. The heatsink 39 is fitted together with the frame 4 using screws or shrinkage fitting, and is configured such that heat from the switching elements 33 is transferred to the frame 4 through the heatsink 39. In addition to the switching elements 33, there are smoothing capacitors, coils for noise reduction, electric power supply relays, busbars that connect these electrically, etc., in the inverter circuit, but these have been omitted from FIG. 1. The busbars are molded integrally with a resin to form intermediate members (not shown).

A controlling circuit board 35 is disposed inside the ECU portion 120, and this controlling circuit board 35 sends controlling signals to the switching elements 33 in order to drive the permanent magnet motor 110 appropriately based on the information that is received through the first and second connectors 30 and 31. The controlling signals are transmitted by connecting members (not shown) that electrically connect the controlling circuit board 35 and the switching elements 33. These connecting members are fixed by wire bonding, press-fitting, or soldering, etc. The inverter circuit and the controlling circuit board 35 are covered by a case 36. The case 36 may be made of a resin, or may be made of a metal such as aluminum, etc., or may have a configuration in which a resin and a metal such as aluminum, etc., are combined. The controlling circuit board 35 is disposed so as to lie in a plane that is perpendicular to the shaft 10 of the permanent magnet motor 110.

The rotation sensor 37 is a magnetic sensor element that detects a magnetic field, and is fixed to the controlling circuit board 35 by soldering, etc. The rotation sensor 37 is disposed at a position that is coaxial with and faces the shaft 10 of the permanent magnet motor 110, and detects a magnetic field that is generated by the rotation sensor permanent magnet 38 to detect an angle of rotation of the rotor 20 of the permanent magnet motor 110 by finding the orientation thereof. The ECU portion 120 supplies an appropriate driving current to the permanent magnet motor 110 in response to this angle of rotation. Moreover, the rotation sensor 37 has a construction in which magnetic flux that leaks through the heatsink 39 from the rotation sensor permanent magnet 38 is detected.

Here, the rotation sensor 37 is mounted onto the controlling circuit board 35, but a separate circuit board may be disposed on a side of the heatsink 39 near the permanent magnet motor 110, and the rotation sensor 37 in question mounted onto the circuit board. Furthermore, the rotation sensor 37 is constituted by a magnetic sensor, but a rotation sensor may alternatively be constituted by a resolver.

Figure 7:
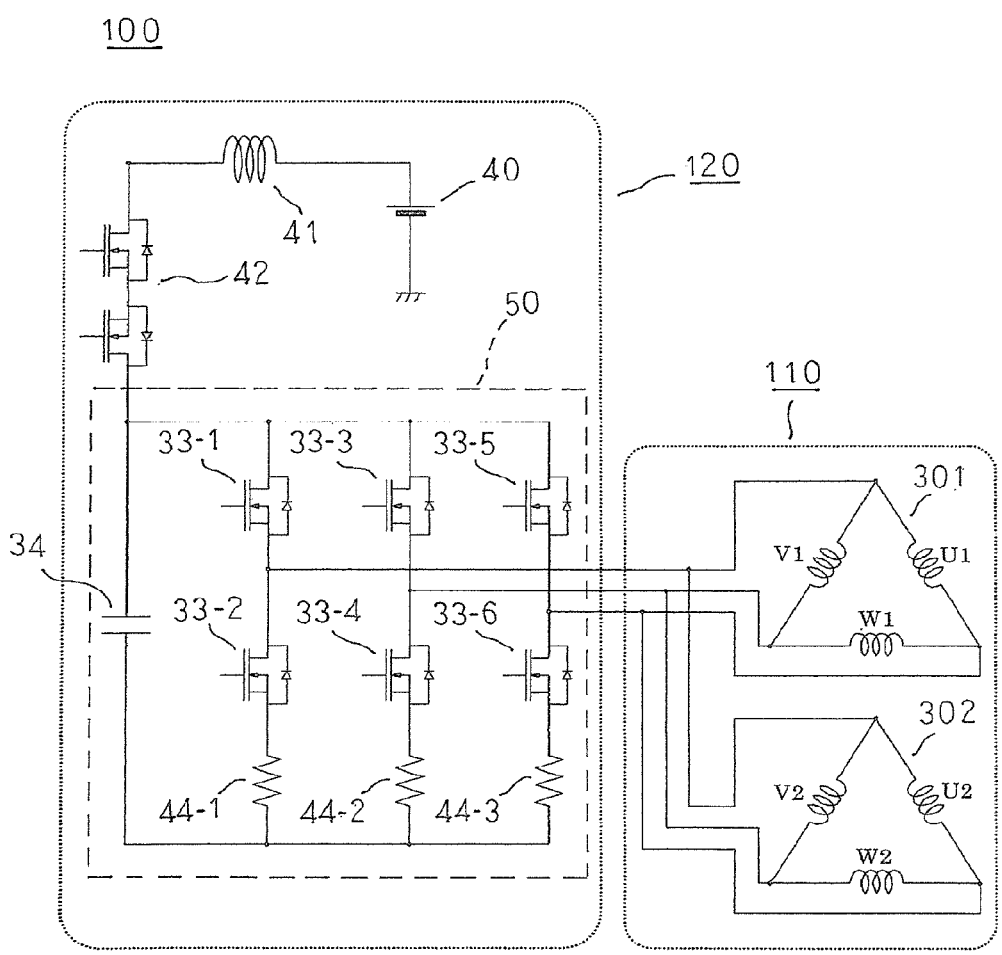
FIG. 7 is a circuit diagram for the driving apparatus-integrated permanent magnet motor according to Embodiment 1 of the present invention.

Next, a circuit configuration for the driving apparatus-integrated permanent magnet motor 100 will be explained with reference to FIG. 7. FIG. 7 is a circuit diagram for the driving apparatus-integrated permanent magnet motor according to Embodiment 1 of the present invention. Moreover, in FIG. 7, for simplicity, only the armature winding of the permanent magnet motor 110 is depicted, and only the power circuit portion of the inverter of the ECU portion 120 is shown.

The permanent magnet motor 110 is a motor in which the number of poles is fourteen, and the number of slots is eighteen. The armature winding 3 of the permanent magnet motor 110 is constituted by: a first armature winding 301 that is configured by delta-connecting a first U-phase winding U1, a first V-phase winding V1, and a first W-phase winding W1; and a second armature winding 302 that is configured by delta-connecting a second U-phase winding U2, a second V-phase winding V2, and a second W-phase winding W2. The ECU portion 120 is constituted by a single inverter circuit 50, and three-phase electric current is supplied to the first and second armature windings 301 and 302 from this inverter circuit 50.

Direct-current power is supplied to the ECU portion 120 from a direct-current power supply 40 such as a battery, and electric power supply relays 42 are connected thereto so as to have a noise reduction coil 41 interposed. The electric power supply relays 42 are constituted by two MOSFETs, and operate such that the electric power supply relays 42 open during failure to prevent excessive electric current from flowing. A capacitor 34 is a smoothing capacitor.

The inverter circuit 50 is constituted by a bridge that uses six switching elements 33-1 through 33-6. Specifically, the inverter circuit 50 is configured by connecting in parallel a pair of switching elements 33-1 and 33-2, a pair of switching elements 33-3 and 33-4, and a pair of switching elements 33-5 and 33-6 that are respectively connected in series. In addition, shunt resistors 44-1, 44-2, and 44-3 are respectively connected to ground (GND) ends of the pair of switching elements 33-1 and 33-2, the pair of switching elements 33-3 and 33-4, and the pair of switching elements 33-5 and 33-6 that are connected in series. These shunt resistors 44-1, 44-2, and 44-3 are used to detect values of electric current.

Electric current to the armature winding 3 is respectively supplied from a connecting point between the switching elements 33-1 and 33-2 through busbars, etc., to a connection portion between the U1 phase and the V1 phase and a connection portion between the U2 phase and the V2 phase, from a connecting point between the switching elements 33-3 and 33-4 through busbars, etc., to a connection portion between the V1 phase and the W1 phase and a connection portion between the V2 phase and the W2 phase, and from a connecting point between the switching elements 33-5 and 33-6 through busbars, etc., to a connection portion between the W1 phase and the U1 phase and a connection portion between the W2 phase and the U2 phase. Electrical connections between the permanent magnet motor 110 and the ECU portion 120 are at three positions in total, i.e., one for each of the three phases, but are distributed between the first armature winding 301 and the second armature winding 302 inside the permanent magnet motor 110.

Here, the direct-current power supply 40 is depicted as if it were inside the ECU portion 120, but in fact electric power is supplied from an external direct-current power supply 40 through the electric power supply connector 32. Connection is made sequentially in order of the direct-current power supply 40, the coil 41, and the electric power supply relays 42, but the electric power supply relays 42 may be disposed at positions that are closer to the direct-current power supply 40 than the coil 41. The capacitor 34 is constituted by a single capacitor, but may be configured by connecting a plurality of capacitors in parallel. Three shunt resistors 44-1, 44-2, and 44-3 are used, but because an electric current value can be detected even using only a single shunt resistor, the number of shunt resistors is not limited to three. Furthermore, delta-connected first and second armature windings are used, but wye-connected first and second armature windings may be used.

Figure 8:
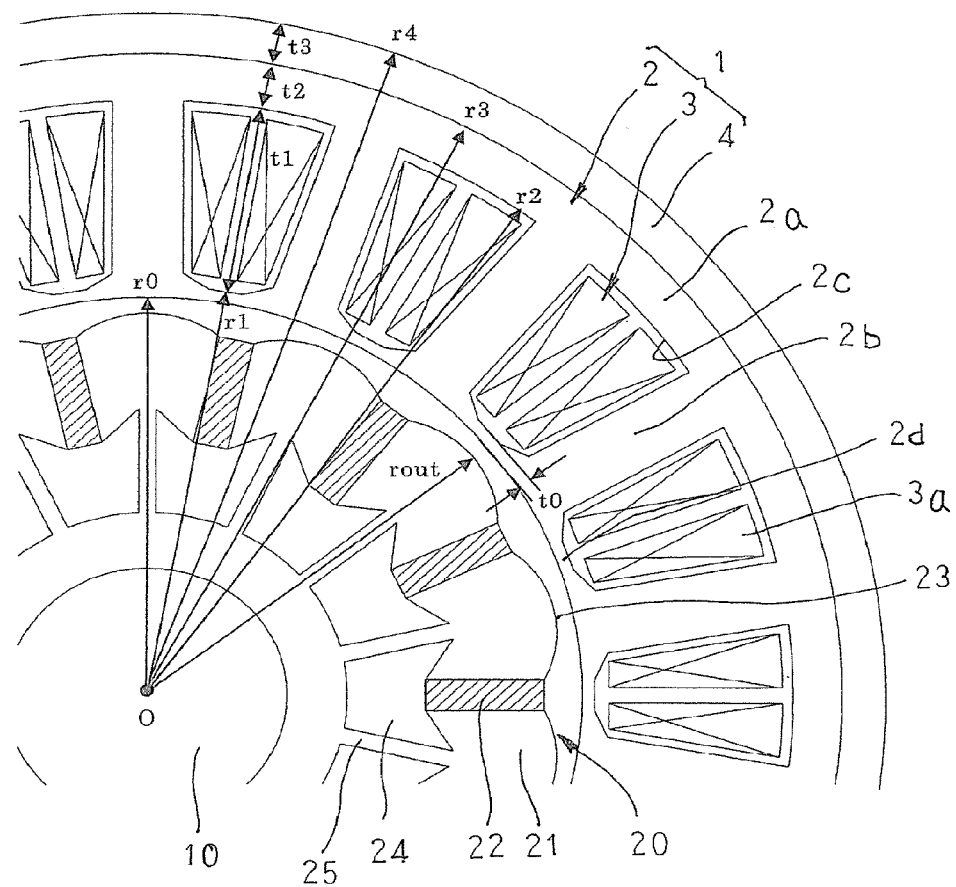
FIG. 8 is a diagram that explains dimensions of the permanent magnet motor according to Embodiment 1 of the present invention.

How the present invention achieves reductions in size and increases in output while also achieving reductions in vibration and noise will now be explained. FIG. 8 is a diagram that explains dimensions of the permanent magnet motor according to Embodiment 1 of the present invention. In the figure, O is a center of rotation of the permanent magnet motor, rout is an outside radius of the rotor 20, r0 is an inside radius of the stator core 2, r1 is a distance from the center of rotation O to an outer circumference of the connecting portion 2d, r2 is an inside radius of the core back 2a, r3 is an outside radius of the core back 2a, r4 is an outside radius of the frame 4, t0 is a radial thickness of the connecting portion 2d, t1 is a distance from an outer circumferential surface of the connecting portion 2d to an inner circumferential surface of the core back 2a, t2 is a thickness of the core back 2a, and t3 is a thickness of the frame 4.

Figure 9:
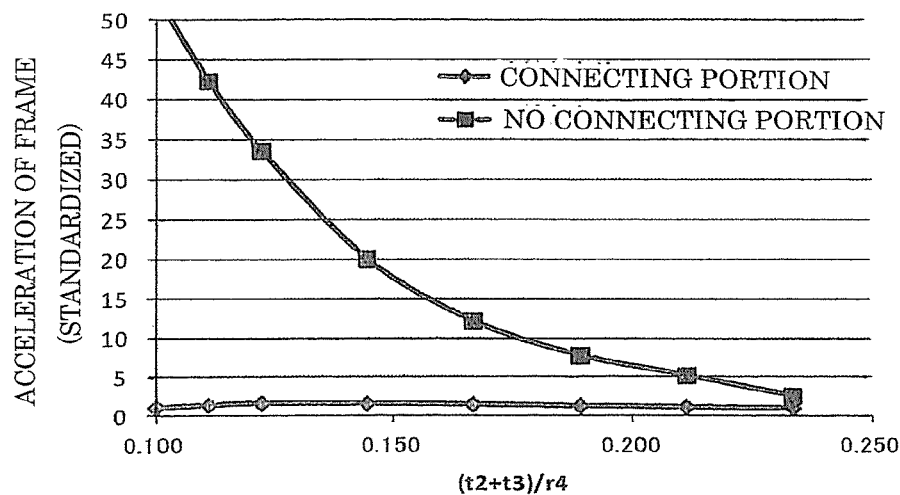
FIG. 9 is a graph that shows relationships between vibrational acceleration of a frame and presence or absence of connecting portions in the permanent magnet motor according to Embodiment 1 of the present invention.

First, a permanent magnet motor according to the present invention that used a stator core 2 that had a connecting portion 2d and a comparative permanent magnet motor that used a stator core that had no connecting portion were prepared, and results of passing a rated electric current of 100 Arms through the permanent magnet motors and measuring vibrational acceleration of the frame 4 at a rotational frequency of 1,000 rpm are shown in FIG. 9. These results are for cases in which a frame 4 that is produced using aluminum or an aluminum alloy such as ADC12 was used. Moreover, the horizontal axis represents (t2+t3)/r4, which is a dimensionless value in which the sum of the core back thickness t2 and the frame thickness t3 is divided by the outside radius r4 of the frame. The vertical axis represents a dimensionless value in which acceleration when there is a connecting portion 2d is standardized to 1 at (t2+t3)/r4=0.233, where (t2+t3)/r4 is sufficiently large and the effects of the connecting portion 2d are negligible.

It can be seen from the results in FIG. 9 that acceleration, i.e., vibration, of the frame 4 can be reduced significantly by disposing the connecting portion 2d on the tip ends of the teeth 2b. It can be seen that whereas when there is no connecting portion 2d, acceleration increases rapidly if the thicknesses of the core back 2a and the frame 4 are reduced, i.e., if (t2+t3)/r4 is reduced, when there is a connecting portion 2d, acceleration does not increase rapidly even if (t2+t3)/r4 is reduced. Moreover, the greater the acceleration the greater vibration and noise in the motor become.

Figure 10:
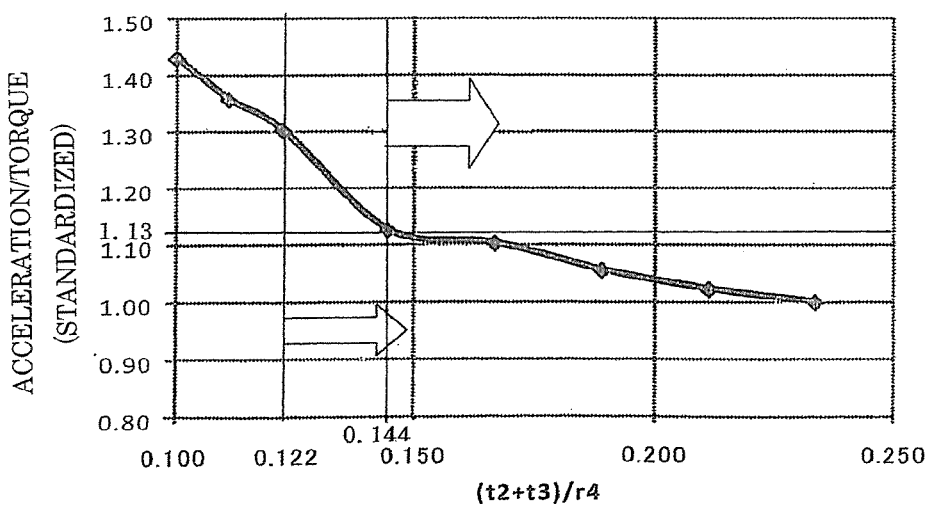
FIG. 10 is a graph that shows a relationship between vibrational acceleration of the frame and motor torque in the permanent magnet motor according to Embodiment 1 of the present invention.

Next, results of passing a rated electric current of 100 Arms through a permanent magnet motor according to the present invention that used a stator core 2 that had a connecting portion 2d and measuring a value (acceleration per unit torque) in which vibrational acceleration (m/s²) of the frame 4 at a rotational frequency of 1,000 rpm is divided by motor torque (Nm) are shown in FIG. 10. These results are for cases in which a frame 4 that is produced using aluminum or an aluminum alloy such as ADC12 was used. The horizontal axis represents (t2+t3)/r4. The vertical axis represents acceleration per unit torque as a standardized value (a dimensionless value) when (t2+t3)/r4=0.233.

It can also be seen from the results in FIG. 10 that acceleration per unit torque drops rapidly after exceeding (t2+t3)/r4=0.122. From this it can be seen that if (t2+t3)/r4≥0.122, acceleration per unit torque can be suppressed to a thirty percent increase compared to (t2+t3)/r4=0.233, where the frame 4 and the core back 2a are fully thick, reducing vibration and reducing noise.

In addition, if (t2+t3)/r4≥0.144, changes in acceleration per unit torque as (t2+t3)/r4 is changed are gradual compared to when (t2+t3)/r4<0.144, and acceleration per unit torque can be suppressed to a thirteen percent increase compared to when (t2+t3)/r4=0.233, where the frame 4 and the core back 2a are fully thick. Thus, it can be seen that if (t2+t3)/r4≥0.144, acceleration per unit torque can further be reduced, reducing vibration and reducing noise.

Figure 11:
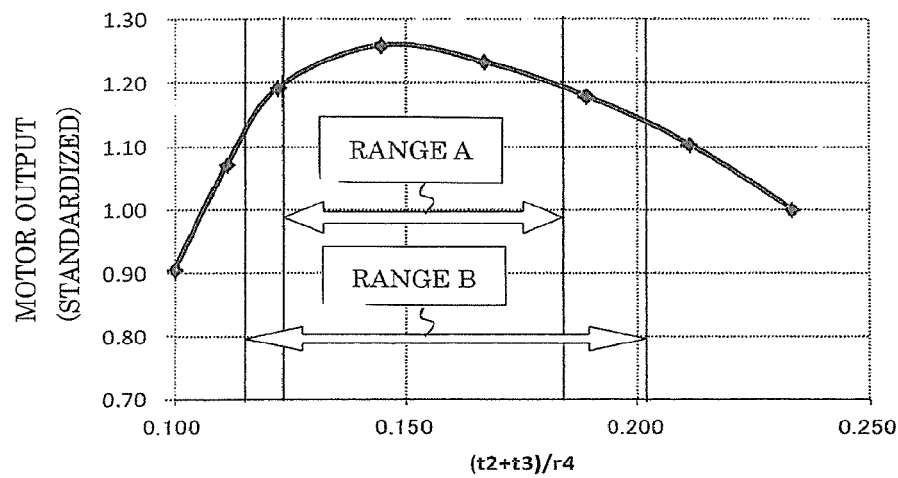
FIG. 11 is a graph that shows a relationship between (t2+t3)/r4 and motor output in the permanent magnet motor according to Embodiment 1 of the present invention.

Next, results of measuring motor output relative to (t2+t3)/r4 in a permanent magnet motor according to the present invention that used a stator core 2 that had a connecting portion 2d are shown in FIG. 11. These results are for cases in which a frame 4 that is produced using aluminum or an aluminum alloy such as ADC12 was used. The horizontal axis represents (t2+t3)/r4. The vertical axis represents a standardized value (a dimensionless value) when (t2+t3)/r4=0.233.

It can be seen from the results in FIG. 11 that motor output describes an upwardly convex curve, and reaches a maximum value in a vicinity of (t2+t3)/r4=0.144. Specifically, it can be inferred that motor output was reduced when (t2+t3)/r4 was reduced, because magnetic flux density of the core back 2a is high, giving rise to magnetic saturation and reducing motor torque. It can also be inferred that when (t2+t3)/r4 is large, slot cross-sectional area is reduced, copper loss increases, and motor output is reduced. Furthermore, battery voltage is low, i.e., approximately 12 V, in the electric power steering apparatus 500, and motor output is also reduced if the slot cross-sectional area is reduced, because armature winding resistance increases, increasing voltage drop, and the voltage that is applied to the permanent magnet motor drops, reducing rotational frequency. Thus, if set to Range B in FIG. 11, i.e., 0.117≤(t2+t3)/r4≤0.202, one effect is that motor output that is greater than or equal to 90 percent of the maximum value of the motor output is obtained because magnetic saturation of the core back 2a is alleviated, and copper loss can also be reduced. In addition, if preferably set to Range A in FIG. 11, i.e., 0.124≤(t2+t3)/r4≤0.182, the effect is that motor output that is greater than or equal to 95 percent of the maximum value of the motor output is obtained. Consequently, if the results of FIGS. 10 and 11 are put together, then reductions in size and increases in output can be achieved while also achieving reductions in vibration and noise if set to 0.122≤(t2+t3)/r4≤0.202, because motor output that is greater than or equal to 90 percent of the maximum value of the motor output is obtained, and frame vibrational acceleration per unit torque is also reduced. Furthermore, if set to 0.144≤(t2+t3)/r4≤0.202, frame vibrational acceleration per unit torque can be further reduced, further enabling reductions in size and increases in output while also achieving reductions in vibration and noise.

Figure 12:
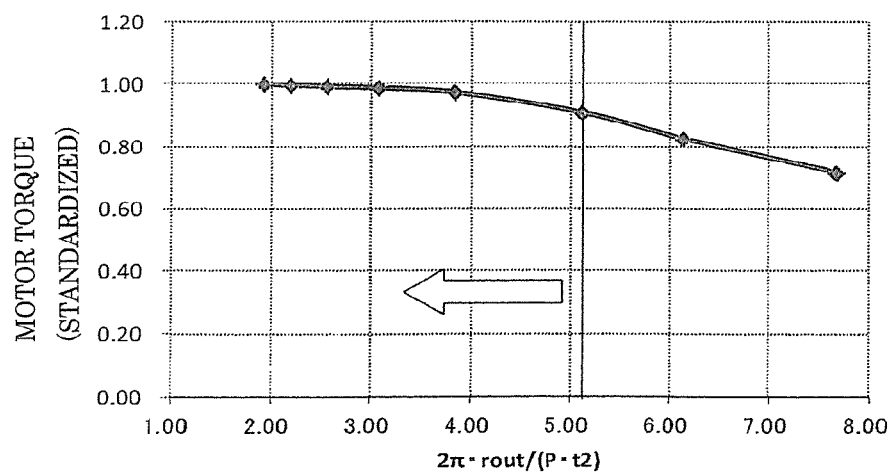
FIG. 12 is a graph that shows a relationship between 2π·rout/(P·t2) and motor torque in the permanent magnet motor according to Embodiment 1 of the present invention.

Next, results of measuring motor torque in a permanent magnet motor according to the present invention that used a stator core 2 that had a connecting portion 2d are shown in FIG. 12. These results are for cases in which a frame 4 that is produced using aluminum or an aluminum alloy such as ADC12 was used. The horizontal axis represents $2\pi \cdot \text{rout}/(P \cdot t2)$. Here, P is the number of poles in the motor. $2\pi \cdot \text{rout}/(P \cdot t2)$ is a value in which the value of the outside circumference of the rotor $2\pi \cdot \text{rout}$ divided by the number of poles is further divided by t2. If Bg is magnetic flux density in an air gap portion between the stator 1 and the rotor 20, and Bcb is magnetic flux density in the core back 2a, then Bcb is approximated by Expression (1).

$$Bcb = 2\pi \cdot \text{rout}/(P \cdot t2) \qquad \text{Expression (1)}$$

In other words, $2\pi \cdot \text{rout}/(P \cdot t2)$ is an index that represents the magnitude of the magnetic flux density in the core back 2a. The vertical axis is a standardized value for torque, being standardized based on a case in which $2\pi \cdot \text{rout}/(P \cdot t2)=1.92$, which is a case in which thickness of the core back 2a is sufficiently large.

It can be seen from the results in FIG. 12 that effects enabling increased torque can be obtained if $2\pi \cdot \text{rout}/(P \cdot t2)$ is set to less than or equal to 5.20, because a motor torque that is greater than or equal to 90 percent when the thickness of the core back 2a is sufficiently large can be generated.

Figure 13:
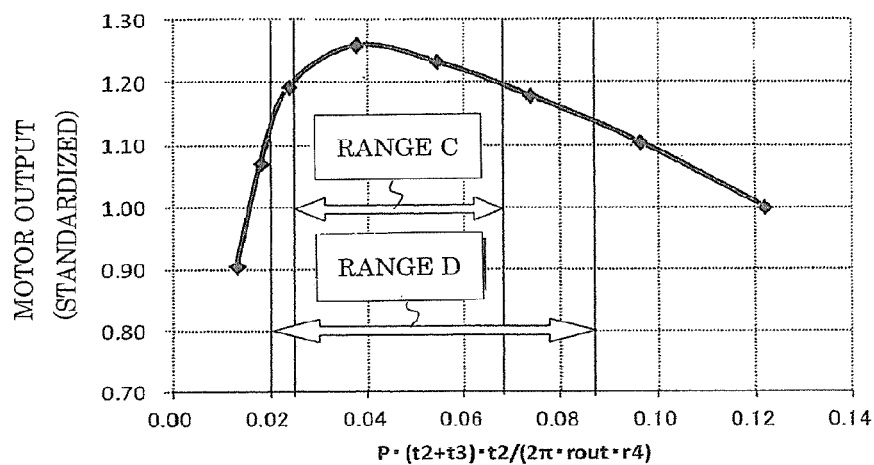
FIG. 13 is a graph that shows a relationship between P·(t2+t3)·t2/(2π·rout·r4) and motor output in the permanent magnet motor according to Embodiment 1 of the present invention.

Results of measuring motor output in a permanent magnet motor according to the present invention that used a stator core 2 that had a connecting portion 2d are shown in FIG. 13. These results are for cases in which a frame 4 that is produced using aluminum or an aluminum alloy such as ADC12 was used. The horizontal axis represents $P \cdot (t2+t3) \cdot t2/(2\pi \cdot \text{rout} \cdot r4)$. Here, P is the number of poles in the motor. $P \cdot (t2+t3) \cdot t2/(2\pi \cdot \text{rout} \cdot r4)$ is a value in which (t2+t3)/r4 is divided by $2\pi \cdot \text{rout}/(P \cdot t2)$. This is an indicator that generally determines the rigidity of the frame 4 and the core back 2a and the magnitude of the magnetic flux density in the core back 2a. The vertical axis standardizes motor output for a case in which $P \cdot (t2+t3) \cdot t2/(2\pi \cdot \text{rout} \cdot r4)=0.122$.

It can be seen from the results in FIG. 13 that if set to Range D, i.e., $0.0211 \leq P \cdot (t2+t3) \cdot t2/(2\pi \cdot \text{rout} \cdot r4) \leq 0.0874$, motor output that is greater than or equal to 90 percent of the maximum value of the motor output is obtained because magnetic saturation of the core back 2a is alleviated, and copper loss can also be reduced. In addition, it can be seen that if set to Range C, i.e., $0.025 \leq P \cdot (t2+t3) \cdot t2/(2\pi \cdot \text{rout} \cdot r4) \leq 0.0675$, motor output that is greater than or equal to 95 percent of the maximum value of the motor output is obtained.

Next, the radial thickness t0 of the connecting portion 2d and a sheet thickness tc of the steel sheets that constitute the stator core 2 will be described. The stator core 2 is configured by laminating thin steel sheets in order to reduce eddy currents. The steel sheets used are such that tc is 0.35 mm through 0.7 mm. The steel sheets are produced by punching using a die, and if consideration is given to punchability, it is preferable for the width to be greater than the sheet thickness by approximately half. At the same time, the relationship $t0/tc \leq 2.0$ should be generally satisfied in order to prevent torque reductions due to the magnetic leakage flux of the connecting portion 2d. Specifically, it is desirable for t0 and tc to satisfy $0.5 \leq t0/tc \leq 2.0$. Using this configuration, effects of increased torque, reduced vibration, and reduced noise can be obtained because ensuring mechanical strength of the connecting portion 2d and reducing the magnetic leakage flux that passes through the connecting portion 2d can both be achieved.

Also regarding the thickness t2 of the core back 2a and the thickness t3 of the frame 4, if the core back 2a is too thin compared to the frame 4, fixing by shrinkage fitting cannot be performed appropriately. Furthermore, if the frame 4 is too thin compared to the core back 2a, the frame 4 may split due to temperature changes, etc., enabling the stator 1 to rotate. Thus, they are set to $1.00 \leq t2/t3 \leq 1.75$. Using this configuration, fixing to the frame 4 can be performed appropriately, and the frame 4 is also prevented from splitting and enabling the stator 1 to rotate.

Figure 14:
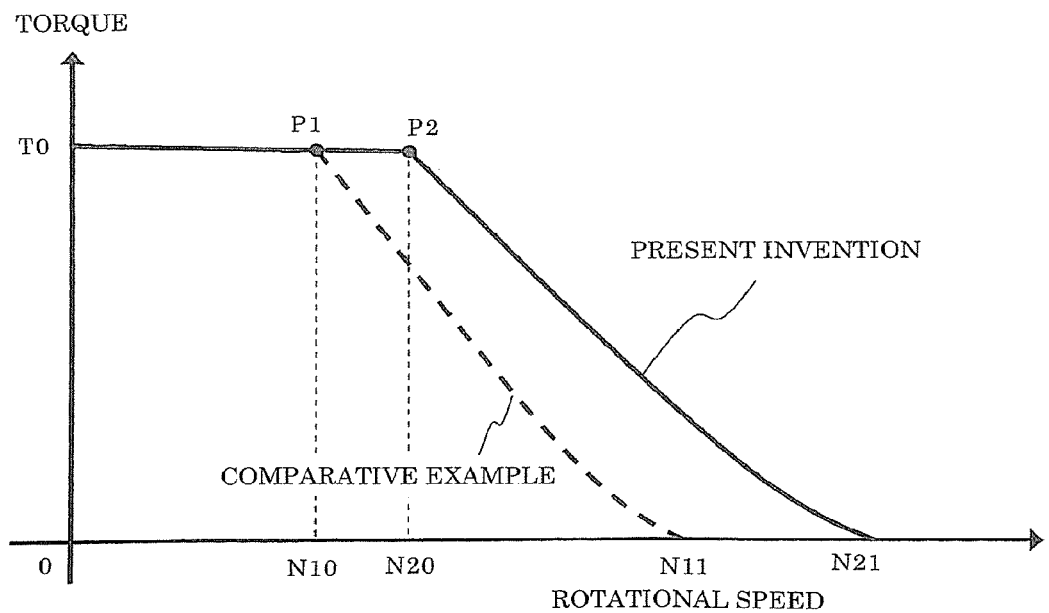
FIG. 14 is a graph that shows a relationship between rotational speed and motor torque in the permanent magnet motor according to Embodiment 1 of the present invention.

Next, a permanent magnet motor according to the present invention, and a comparative permanent magnet motor that used a stator core in which the inner circumferential surfaces of the core back were rectilinear shapes, and that had no connecting portion were prepared, and results of measuring a relationship between rotational speed and motor torque in the permanent magnet motors are shown in FIG. 14. The horizontal axis represents rotational speed, and the vertical axis is motor torque. The curve that is indicated by a broken line is the comparative example, and the curve that is indicated by a solid line is the present invention. Specifically, the broken line that joins point (0, T0)=(rotational speed, torque), Point P1, and point (N11, 0) shows the properties of the comparative example, and the solid line that joins point (0, T0)=(rotational speed, torque), Point P2, and point (N21, 0) shows the properties of the present invention. Cases in which the permanent magnet motors of the present invention and the comparative example are designed to have identical rated torque have been compared.

From the results in FIG. 14, the curve bends at the point of a rotational speed N10 (Point P1) in the comparative example. This represents a phenomenon in which voltage that can be applied to the permanent magnet motor reaches a limit due to voltage drop and armature reaction due to the ECU portion and motor resistance, reducing motor torque. In the properties of the present invention, on the other hand, voltage drop due to armature winding resistance can be reduced significantly because the resistance of the armature winding 3 can be reduced by increasing the slot cross-sectional area. Because of that, motor output is improved compared to the comparative example because it is improved to a point at which rotational speed is N20. Consequently, in a electric power steering apparatus that is equipped with the driving apparatus-integrated permanent magnet motor 100, one effect is that fuel consumption improving effects that can also be applied to large vehicles can be obtained due to increased output compared to the comparative example.

Point (N11, 0) and point (N21, 0) represent maximum rotational speeds when motor torque is zero, and in the present invention, the magnetic circuit construction is such that effects of flux weakening control are easily exhibited due to increased d-axis inductance because the tip ends of the adjacent teeth 2b are connected together by the connecting portion 2d. Because of that, effects such as enabling rotational speed to be improved compared to the comparative example can be obtained. Improving rotational speed also means improving motor torque during high-speed rotation. Thus, if the driving apparatus-integrated permanent magnet motor 100 is mounted to an electric power steering apparatus, one effect is that the permanent magnet motor 110 generates motor torque appropriately, and can achieved appropriate assistance even if the driver performs rapid steering.

The driving apparatus-integrated permanent magnet motor 100 according to Embodiment 1 includes: a permanent magnet motor 110 that has: a stator 1 that has: an armature winding 3; a stator core 2; and a frame 4 which is disposed on an outer circumferential portion of the stator core 2; and a rotor 20 that has a rotor core 21 and permanent magnets 22; and an ECU portion 120 that has: switching elements 33 that supply electric current to the armature winding 3; and a heatsink 39 to which the switching elements 33 are mounted, the permanent magnet motor 110 and the ECU portion 120 being configured so as to be integrated so as to line up coaxially such that the heatsink 39 is fitted into the frame 4.

Because the greatest common divisor of the number of poles and the number of slots in the permanent magnet motor 110 is two, and the armature winding 3 is configured using coils 3a that are wound in concentrated windings on the teeth 2b of the stator core 2, electromagnetic vibrational forces in a second order spatial mode arise in the permanent magnet motor 110. Even if the magnitude of the electromagnetic vibrational forces is equal, the core back 2a and the frame 4 deform significantly in the second order spatial mode compared to third order or greater spatial modes. In Embodiment 1, because the tip end portions of the adjacent teeth 2b are connected to each other by the connecting portion 2d, vibration noise due to electromagnetic vibrational forces in the second order spatial mode can be reduced, as shown in FIG. 9. Because the armature winding 3 is configured using concentrated-winding coils 3a, coil ends are reduced, and armature winding resistance is also reduced, enabling compactness and high output.

The stator core 2 and the frame 4 are configured so as to satisfy $0.122 \leq (t2+t3)/r4 \leq 0.202$. Here, r2 is an inside radius of the core back 2a, r3 is an outside radius of the core back 2a, and r4 is an outside radius of the frame 4. Using this configuration, acceleration per unit torque can be suppressed to less than or equal to a thirty percent increase, and low vibration and low noise can be achieved compared to when that the thickness of the core back 2a and the frame 4 is fully thick, as shown in FIG. 10. In addition, as shown in FIG. 11, motor output that is greater than or equal to 90 percent of the motor output when the thickness of the core back 2a and the frame 4 is fully thick can be achieved. In other words, because the stator core 2 and the frame 4 are configured so as to satisfy $0.122 \leq (t2+t3)/r4 \leq 0.202$, slot cross-sectional area can be increased while ensuring rigidity such that that vibration and noise do not increase, enabling reductions in size and increases in output to be achieved while also achieving reductions in vibration and noise.

Because the driving apparatus-integrated permanent magnet motor 100 includes a permanent magnet motor 110 that can reconcile compactness and high output with low vibration and low noise in this manner, an electric power steering apparatus 500 that is equipped with the driving apparatus-integrated permanent magnet motor 100 can improve layout freedom of the electric power steering apparatus 500 in a vehicle, and also enable fuel consumption and driver comfort to be improved. In addition, if the electric power steering apparatus 500 is a mechanical rack and pinion, the merits of reduction in size are greater, because the driving apparatus-integrated permanent magnet motor 100 is disposed so as to be parallel to the rack shaft.

Because it is an interior permanent magnet (IPM) construction in which permanent magnets 22 are embedded in a rotor core 21, electromagnetic vibrational forces are increased and vibration noise is also increased compared to surface magnet types in which permanent magnets 22 are disposed on a surface of the rotor core 21. However, by making the connection configuration of the armature winding 3 as in FIGS. 2, 3, and 4, second order spatial electromagnetic vibrational forces can be reduced, reducing vibration and reducing noise. In other words, increased torque and reductions in vibration and noise can be reconciled even in interior permanent magnet (IPM) constructions.

Because the driving apparatus-integrated permanent magnet motor 100 that is configured in this manner includes a permanent magnet motor 110 that can reconcile compactness and high output with low vibration and low noise, if mounted to a electric power steering apparatus such that the shaft 10 is parallel to the direction of movement of the rack shaft, improvements in mountability of the electric power steering apparatus to the vehicle and fuel consumption can be achieved, and improvements in driver comfort can also be achieved.

Figure 15:
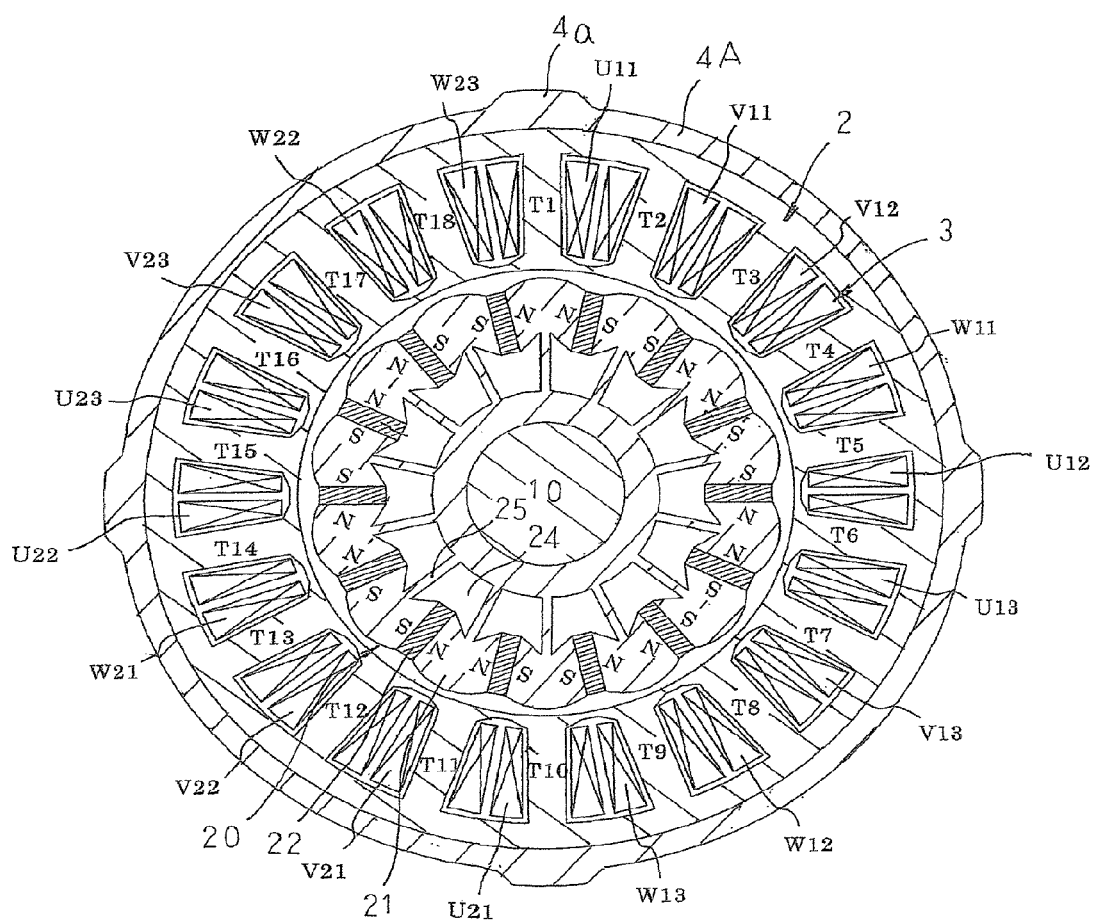
FIG. 15 is a lateral cross section that shows a variation of the permanent magnet motor according to Embodiment 1 of the present invention.
Figure 16:
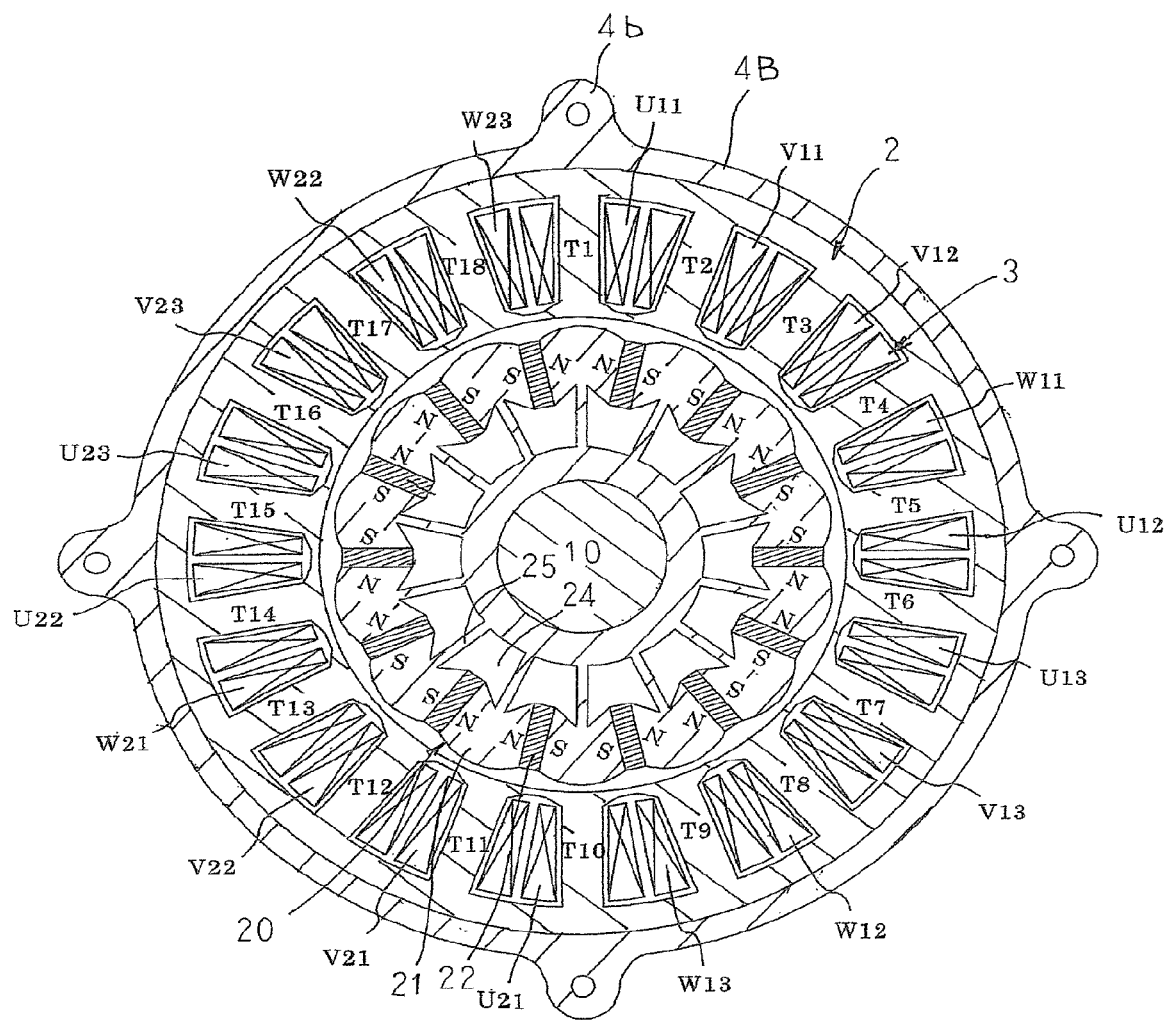
FIG. 16 is a lateral cross section that shows another variation of the permanent magnet motor according to Embodiment 1 of the present invention.

Moreover, in Embodiment 1 above, a case in which a radial thickness of the frame 4 is uniform has been explained, but it is not necessary for the radial thickness of the frame to be uniform circumferentially. As shown in FIG. 15, for example, four protruding portions 4a may respectively be disposed so as to protrude radially outward from a frame 4A at a uniform angular pitch circumferentially. Alternatively, as shown in FIG. 16, four screw-threaded portions 4b may respectively be disposed so as to protrude radially outward from a frame 4B at a uniform angular pitch circumferentially. In those cases, radial thickness of the frame 4A or 4B increases somewhat at the portions of the protruding portions 4a or the screw-threaded portions 4b, but because rigidity against the electromagnetic vibrational forces in the second order spatial mode is practically determined by the thickness t3 of the frame 4A or 4B, reconciliation of compactness and high output and low vibration and low noise can be achieved if the stator core 2 and the frame 4A or 4B are configured so as to satisfy $0.122 \leq (t2+t3)/r4 \leq 0.202$.

In Embodiment 1 above, compactness and high output is reconciled with low vibration and low noise using a permanent magnet motor 110 in which the greatest common divisor of the number of poles and the number of slots is two. A permanent magnet motor 110 in which the greatest common divisor of the number of poles and the number of slots is two generates electromagnetic vibrational forces in the second order spatial mode that deform the core back 2a and the frame 4 significantly compared to the electromagnetic vibrational forces in third order or greater spatial modes. Thus, it goes without saying that the present invention can achieve similar or identical effects even using a permanent magnet motor 110 in which the greatest common divisor of the number of poles and the number of slots is other than two.

Embodiment 2

Figure 17:
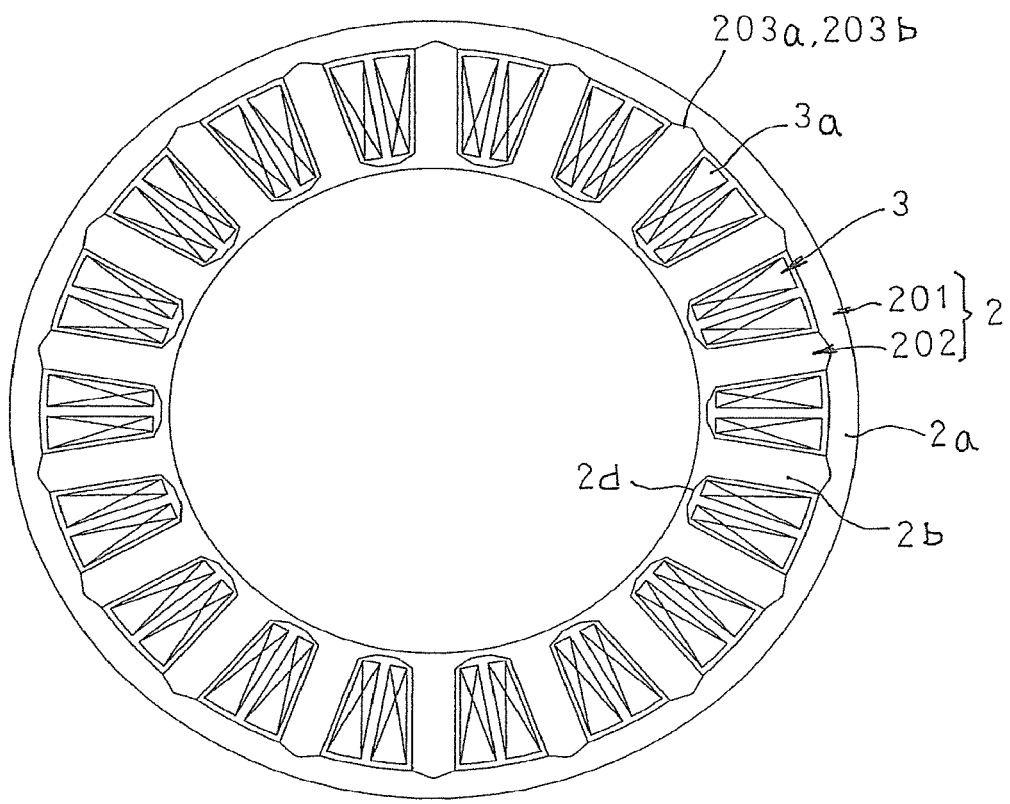
FIG. 17 is an end elevation that shows a stator in a permanent magnet motor according to Embodiment 2 of the present invention.
Figure 18:
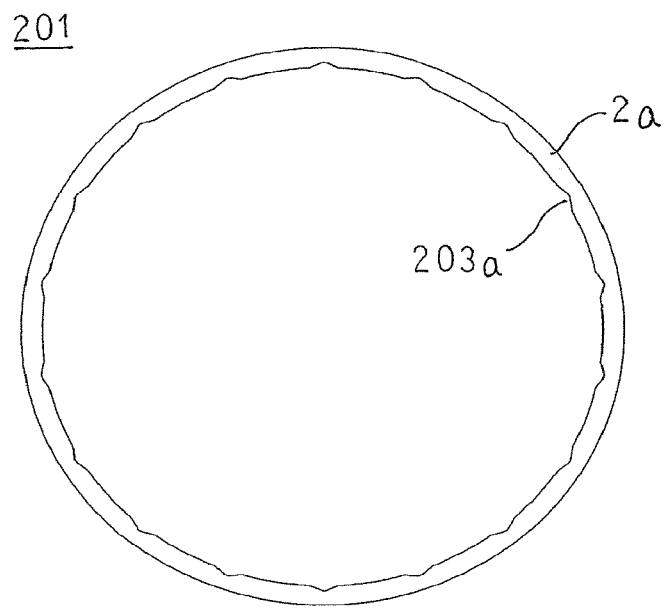
FIG. 18 is an end elevation that shows an outer core that constitutes part of a stator core in the permanent magnet motor according to Embodiment 2 of the present invention.
Figure 19:
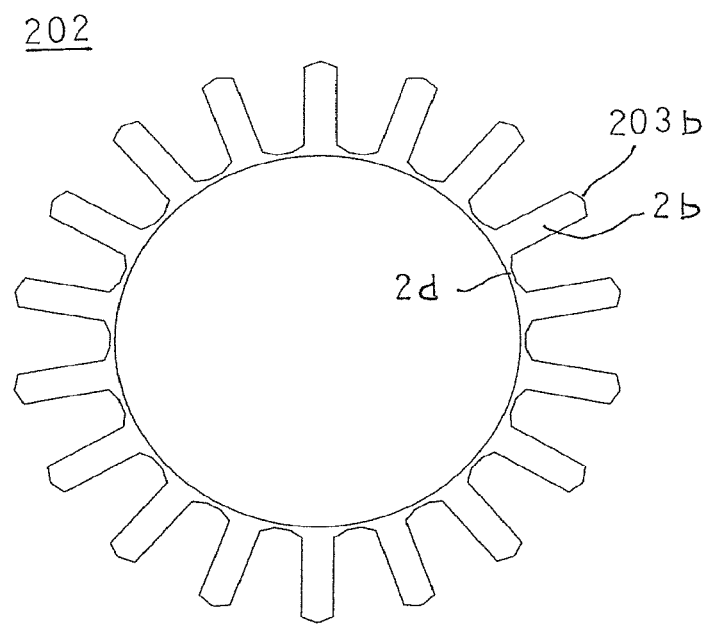
FIG. 19 is an end elevation that shows an inner core that constitutes part of the stator core in the permanent magnet motor according to Embodiment 2 of the present invention.
Figure 20:
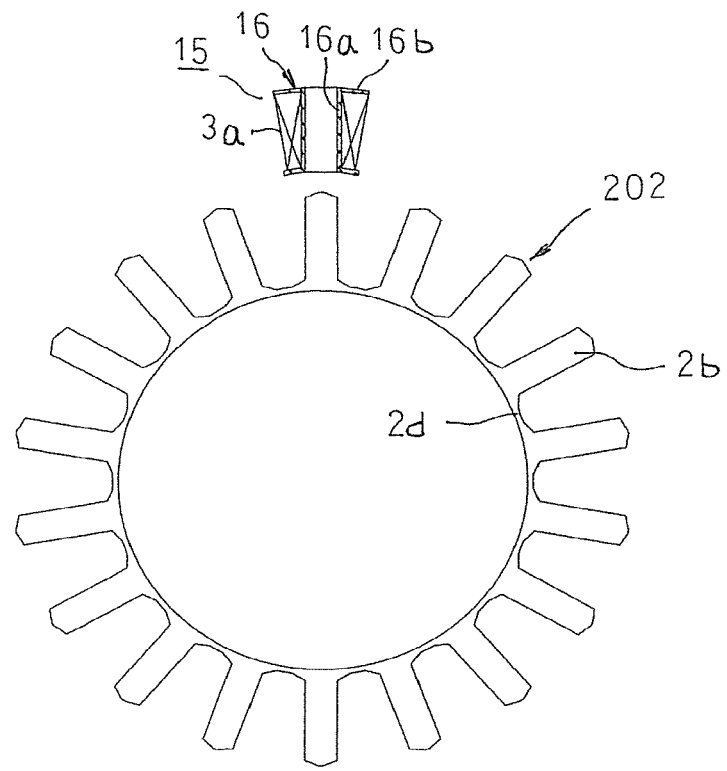
FIG. 20 is a diagram that explains a method for mounting coils to the inner core in the permanent magnet motor according to Embodiment 2 of the present invention.
Figure 21:
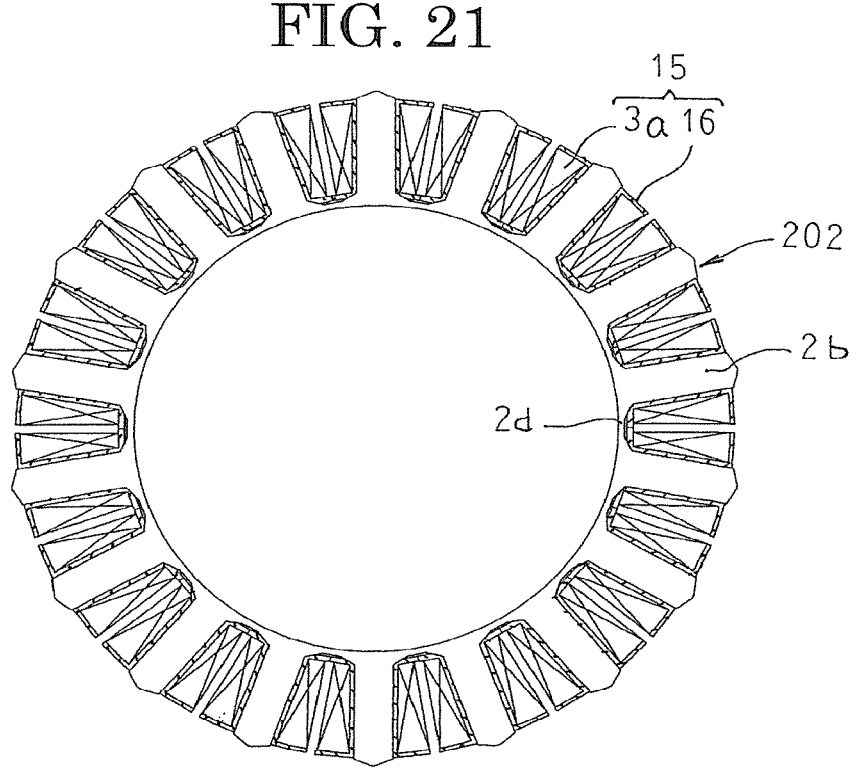
FIG. 21 is an end elevation that shows a state in which the coils are mounted to the inner core in the permanent magnet motor according to Embodiment 2 of the present invention.

In Embodiment 2, an example of the stator core 2 in Embodiment 1 above will be explained. FIG. 17 is an end elevation that shows a stator in a permanent magnet motor according to Embodiment 2 of the present invention, FIG. 18 is an end elevation that shows an outer core that constitutes part of a stator core in the permanent magnet motor according to Embodiment 2 of the present invention, FIG. 19 is an end elevation that shows an inner core that constitutes part of the stator core in the permanent magnet motor according to Embodiment 2 of the present invention, FIG. 20 is a diagram that explains a method for mounting coils to the inner core in the permanent magnet motor according to Embodiment 2 of the present invention, and FIG. 21 is an end elevation that shows a state in which the coils are mounted to the inner core in the permanent magnet motor according to Embodiment 2 of the present invention. Moreover, for simplicity, a frame is omitted from FIG. 17. For simplicity, coils are represented in cross section in FIG. 17. For simplicity, coil bodies are also represented in cross section in FIGS. 20 and 21.

In FIGS. 17 through 19, the stator core 2 is configured so as to be divided into: an annular outer core 201 that forms a core back 2a; and an inner core 202 that forms teeth 2b and a connecting portion 2d. Eighteen interfitting recess portions 203a are respectively formed by hollowing out an inner circumferential surface of the outer core 201 radially outward at a uniform angular pitch circumferentially. Interfitting protruding portions 203b are formed so as to protrude radially outward from respective outer circumferential end surfaces of the teeth 2b. The stator core 200 is configured by joining the outer core 201 and the inner core 202 by fitting together the interfitting recess portions 203a and the interfitting protruding portions 203b. Coils 3a are wound onto the respective teeth 2b so as to have insulators (not shown) interposed. The outer core 201 and the inner core 202 may be produced by laminating electromagnetic steel sheets, or may be produced as powder cores.

To assemble the stator 1 that is configured in this manner, insulators 16 are first prepared. The insulators 16 are molded bodies of insulating resin, for example, and include: a tubular drum portion 16a that has an internal shape that is approximately identical to the external shape of the teeth 2b; and a pair of flange portions 16b that protrude radially outward from two axial end portions of the drum portion 16a. Coil bodies 15 are produced by winding the coils 3a onto the drum portions 16a of the insulators 16. Next, as shown in FIG. 20, the coil bodies 15 are mounted onto the teeth 2b from radially outside such that are inserted into the drum portions 16a of the insulators 16. As shown in FIG. 21, the coil bodies 15 are mounted so as to be fitted over all of the teeth 2b. Next, the outer core 201 and the inner core 202 to which the coils 3 have been mounted are joined by fitting together the interfitting recess portions 203a and the interfitting protruding portions 203b. Next, the stator core 2, to which the coil bodies 15 are mounted, and in which the inner core 202 and the outer core 201 are linked, is press-fitted into a frame (not shown), and is fixed by shrinkage fitting, etc., to assemble the stator 1.

According to Embodiment 2, the stator core 2 is assembled by fitting together the interfitting recess portions 203a that are formed on the outer core 201 and the interfitting protruding portions 203b that are formed on the inner core 202. Thus, the positioning of the inner core 202 relative to the outer core 201 is facilitated, and assemblability is improved. In addition, the interfitting portions between the interfitting recess portions 203a and the interfitting protruding portions 203b function as detents for the inner core 202, restricting circumferential movement of the inner core 202.

Coil bodies 15 that are produced by winding coils 3a onto drum portions 16a of insulators 16, that is, coil bodies 15 that include insulators 16 and coils 3a that are wound onto the insulators 16, are mounted onto the teeth 2b of the inner core 202. Because the coils 3a are wound onto the insulators 16 before being mounted onto the teeth 2b in this manner, space factor of the coils 3a can be improved more than by winding the coils 3a directly onto the teeth 2b. Furthermore, because the coils 3a can be wound in a close state, the degree of close contact among the conductor wires that constitute the coils 3a is increased, enabling heat radiating characteristics to be improved. Consequently, if the present driving apparatus-integrated permanent magnet motor in which a permanent magnet motor that uses the stator 1 according to Embodiment 2 is installed is mounted to a electric power steering apparatus, effects can be obtained such as the number of times the steering of the electric power steering apparatus can be repeated being increased, enabling the time that assistance can be continued to be lengthened.

Moreover, in Embodiment 2 above, coil bodies 15 are mounted to all of the teeth 2b, but the present invention is not limited to that configuration, and similar or identical effects can also be achieved if the coil bodies 15 is mounted to every second tooth 2b, for example.

Embodiment 3

Figure 22:
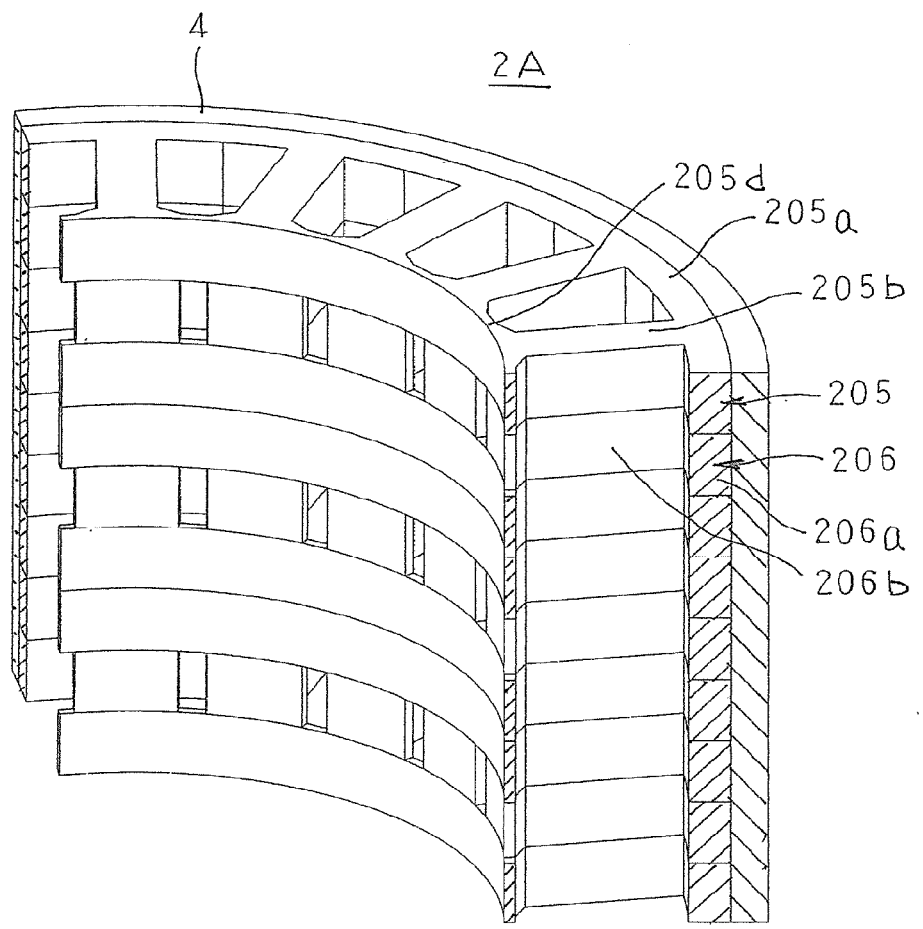
FIG. 22 is an oblique projection that shows a cut out state of a circumferential portion of a stator core in a permanent magnet motor according to Embodiment 3 of the present invention.

FIG. 22 is an oblique projection that shows a cut out state of a circumferential portion of a stator core in a permanent magnet motor according to Embodiment 3 of the present invention.

In FIG. 22, a first stator core portion 205 includes: an annular core back portion 205a; tooth portions 205b that are respectively disposed at a uniform angular pitch circumferentially so as to protrude radially inward from an inner circumferential surface of the core back portion 205a; and a connecting portion 205d that connects together inner circumferential ends of circumferentially adjacent tooth portions 205b. A second stator core portion 206 includes: an annular core back portion 206a; and tooth portions 206b that are respectively disposed at a uniform angular pitch circumferentially so as to protrude radially inward from an inner circumferential surface of the core back portion 206a, and is formed so as to have a similar or identical shape to the first stator core portion 205 except that the connecting portion 205d is omitted. The stator core 2A is configured by stacking and integrating the first stator core portions 205 and the second stator core portions 206 repeatedly in an axial direction in order of a first stator core portion 205, a second stator core portion 206, and a first stator core portion 205. The core back portions 205a and 206a are stacked to constitute a core back of the stator core 2A, and the tooth portions 205b and 206b are stacked to constitute teeth of the stator core 2A.

In a permanent magnet motor according to Embodiment 3, the stator core 2A is used instead of the stator core 2.

In the stator core 2A, first stator core portions 205 in which inner circumferential ends of adjacent tooth portions 205b are connected together by connecting portions 205d and second stator core portions 206 in which inner circumferential ends of adjacent tooth portions 206b are not connected together are arranged so as to alternate axially. Opening portions are formed between the inner circumferential ends of the tooth portions 206b that are not connected. Because connecting portions 205d and opening portions are arranged so as to alternate axially between the inner circumferential ends of the adjacent teeth in this manner, magnetic leakage flux that is generated between the adjacent teeth is reduced. Because the magnetic leakage flux that is generated between the adjacent teeth is reduced, motor torque is improved. Because the magnetic leakage flux that is generated between the adjacent teeth is reduced, magnetic flux density in the teeth is also reduced, reducing torque ripples that result from magnetic saturation.

Figure 23:
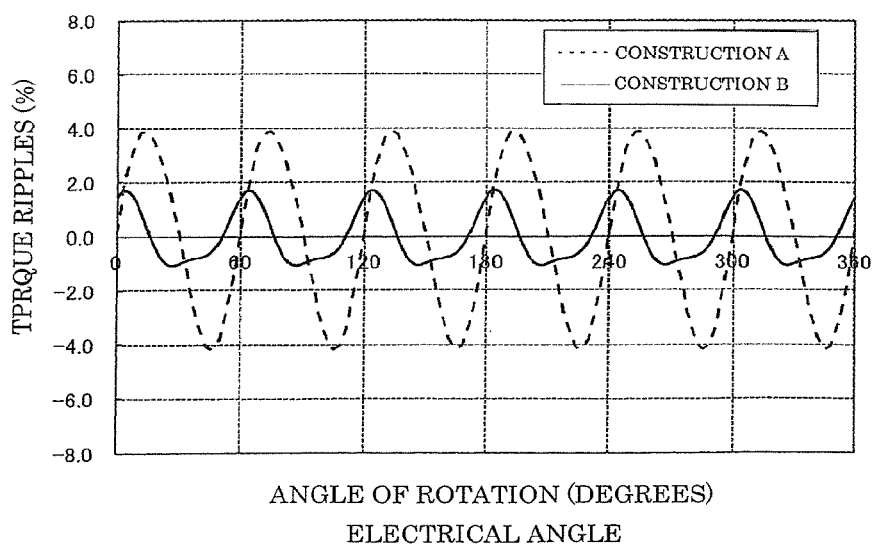
FIG. 23 is a graph that shows relationships between motor rotational angle and torque ripples in the permanent magnet motor according to Embodiment 3 of the present invention.

Now, a permanent magnet motor that used a stator core 2 in which connecting portions 2d were distributed so as to be axially uniform (Construction A), and a permanent magnet motor that used a stator core 2A in which connecting portions 205d and opening portions were disposed so as to alternate axially (Construction B) were produced, and results of measuring torque ripples in the two permanent magnet motors are shown in FIG. 23. Moreover, the horizontal axis represents the angle of rotation of the permanent magnet motor in electrical degrees, and the vertical axis represents torque ripples as a percentage value of the ratio to average torque.

From the results in FIG. 23, it was found that whereas there is approximately four percent torque ripples by 0-p value in a sixty-electrical-degree period in the permanent magnet motor of Construction A, this is reduced to less than or equal to two percent in the permanent magnet motor of Construction B. This may be considered to be due to magnetic saturation being alleviated in the permanent magnet motor of Construction B, because torque ripples arise in a sixty-electrical-degree period in a three-phase motor if magnetic saturation arises in the stator core.

Here, similar effects to those in Embodiment 1 above can be achieved if a driving apparatus-integrated permanent magnet motor in which the permanent magnet motor according to Embodiment 3 is installed is mounted to a electric power steering apparatus.

Embodiment 4

Figure 24:
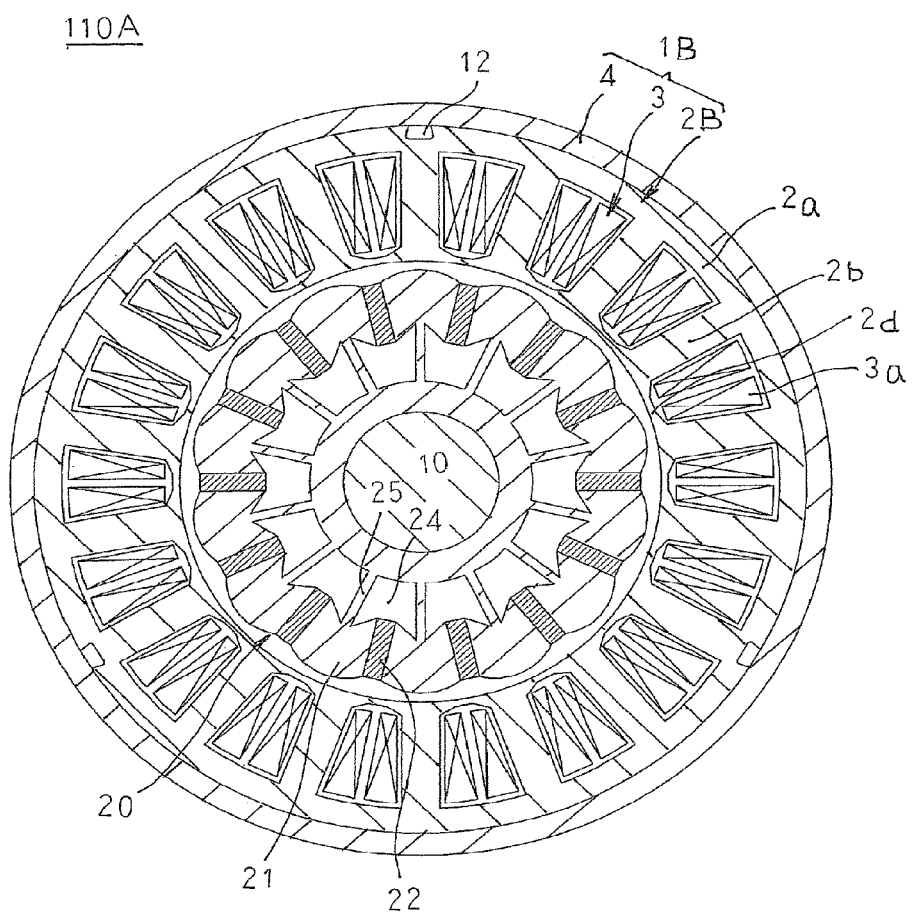
FIG. 24 is a lateral cross section that shows a permanent magnet motor according to Embodiment 4 of the present invention.

FIG. 24 is a lateral cross section that shows a permanent magnet motor according to Embodiment 4 of the present invention.

In FIG. 24, three notch portions 12 are formed on an outer circumferential surface of a core back 2a at a uniform angular pitch. Each of the notch portions 12 is positioned radially outside a circumferential center of a tooth 2b, and is formed so as to extend from the first axial end to the second axial end.

Moreover, the rest of the configuration is formed in a similar or identical manner to that of Embodiment 1 above.

In a stator core 2B that is configured in this manner, reductions in rigidity result from forming the notch portions 12 on the outer circumferential surface of the core back 2a, but because a connecting portion 2d is included, rigidity of the core can be ensured. Thus, a permanent magnet motor 110A that uses the stator core 2B can achieve reconciliation of compactness and high output with low vibration and noise reduction in a similar or identical manner to Embodiment 1 above.

Because the notch portions 12 are formed on the outer circumferential surface of the core back 2a, when press-fitting or shrinkage-fitting the stator core 2B into the frame 4, positioning between the stator core 2B and the frame 4 is made possible by the notch portions 12, improving productivity. When positioning between the stator core 2B and the frame 4 cannot be performed, irregularities in angular position of the stator increase, and phases of the motor electric current become irregular as a result, increasing irregularities in motor torque. However, because positioning between the stator core 2B and the frame 4 is made possible in the permanent magnet motor 110A, quality of the properties of the driving apparatus-integrated permanent magnet motor into which the permanent magnet motor 110A is installed can be improved.

Because the notch portions 12 are disposed at three positions at intervals of 120 degrees circumferentially around the outer circumferential surface of the core back 2a, imbalances arise in the magnetic flux density in the stator core 2B due to the influence of disposing the notch portions 12. The imbalances in the magnetic flux density have components that change in a third spatial order, but this permanent magnet motor 110A has fourteen poles, making the number of poles different than an integral multiple of the number of notch portions 12, which is three. In this case, the imbalances in magnetic flux density have negligible affect on torque ripples. Consequently, it is necessary to select the number of and spacing between the notch portions 12 in response to the number of poles in the permanent magnet motor. If care is taken that the number of poles is an even number, then the influence on torque ripples due to disposing the notch portions 12 can be reduced if the number of notch portions 12 disposed at a uniform pitch is 3n, where n is an integer that is greater than or equal to one, and the number of poles is not 3m, where m is an even number that is greater than or equal to two.

Here, similar effects to those in Embodiment 1 above can be achieved if a driving apparatus-integrated permanent magnet motor in which the permanent magnet motor 110A is installed is mounted to a electric power steering apparatus.

Moreover, in Embodiment 4 above, the notch portions 12 are disposed at strictly uniform spacing, but it goes without saying that it is not necessary for the arrangement of the notch portions 12 to have strictly uniform spacing, and torque ripple-reducing effects can be obtained even if the spacing is nonuniform, and even if the spacing is approximately uniform, such as being disposed at positions that are offset by several degrees through ten degrees, for example.

Embodiment 5

Figure 25:
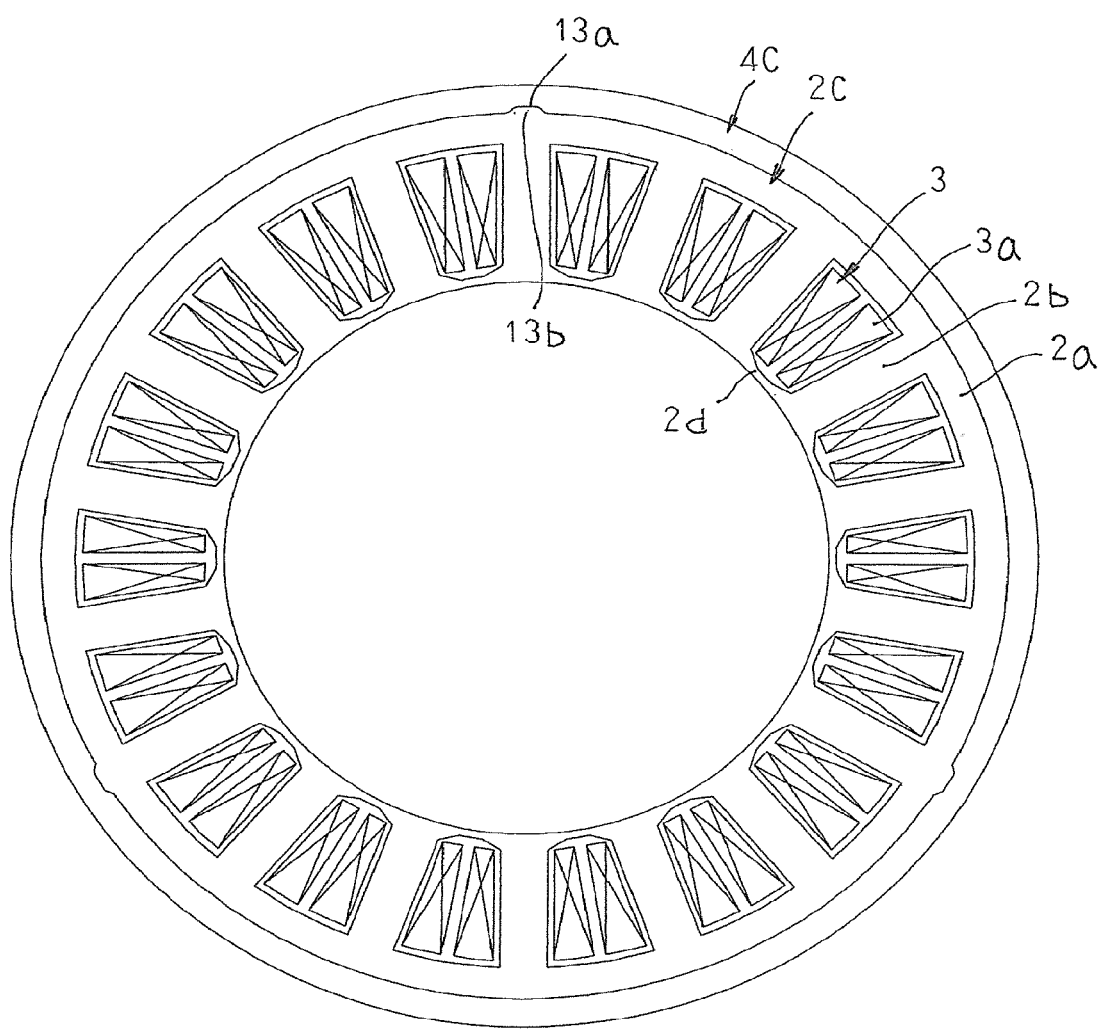
FIG. 25 is an end elevation that shows a stator in a permanent magnet motor according to Embodiment 5 of the present invention.

FIG. 25 is an end elevation that shows a stator in a permanent magnet motor according to Embodiment 5 of the present invention. Moreover, for simplicity, coils are represented in cross section in FIG. 25.

In FIG. 25, three interfitting recess portions 13a are respectively formed at a uniform angular pitch circumferentially around an inner circumferential surface of a frame 4C, i.e., at intervals of 120 degrees, by hollowing out the inner circumferential surface of the frame 4C so as to extend from the first axial end to the second axial end. Three interfitting protruding portions 13b are respectively formed at intervals of 120 degrees circumferentially around an outer circumferential surface of a core back 2a such that the outer circumferential surface of the core back 2a protrudes so as to extend from the first axial end to the second axial end. In addition, each of the interfitting protruding portions 13b is positioned radially outside a tooth 2b. A stator core 2C is fixed to the frame 4C by press-fitting or shrinkage fitting such that the interfitting recess portions 13a and the interfitting protruding portions 13b are fitted together.

Moreover, the rest of the configuration is formed in a similar or identical manner to that of Embodiment 1 above.

In a stator 1C that is configured in this manner, a stator core 2C is configured so as to be fixed to a frame 4C by press-fitting or shrinkage fitting such that interfitting recess portions 13a that are formed on the frame 4C and interfitting protruding portions 13b that are formed on the stator core 2C are fitted together. Thus, the interfitting portions between the interfitting recess portions 13a and the interfitting protruding portions 13b function as detents, restricting circumferential movement of the stator core 2C.

If the frame 4C is produced using aluminum or an aluminum alloy, etc., the fastening force between the frame 4C and the stator core 2C may weaken at high temperatures even if the frame 4C and the stator core 2C are fixed by shrinkage fitting or press-fitting, because the coefficients of linear expansion are different between the frame 4C and the stator core 2C which is produced using electromagnetic steel sheets or a powder core. Thus, situations may arise in which the stator core 2C displaces circumferentially, offsetting the angular position of the stator core 2C from its set position. However, in Embodiment 5, because circumferential movement of the stator core 2C is restricted, circumferential movement of the stator core 2C is prevented even if the fastening force between the frame 4C and the stator core 2C weakens at high temperatures.

In Embodiment 5, because the number of slots is eighteen, and the interfitting protruding portions 13b are disposed on the core back 2a at three positions at intervals of 120 degrees circumferentially, imbalances also arise in the magnetic flux density and stress distribution in the stator core 2C as a result of disposing the interfitting protruding portions 13b on the core back 2a. The imbalances in the magnetic flux density and stress distribution have components that change in a third spatial order, but this permanent magnet motor has fourteen poles, making the number of poles different than an integral multiple of the number of interfitting protruding portions 13b, which is three. In this case, the imbalances in magnetic flux density have negligible affect on torque ripples. Consequently, it is necessary to select the number of and spacing between the interfitting protruding portions 13b in response to the number of poles in the permanent magnet motor. If care is taken that the number of poles is an even number, then the influence on torque ripples due to disposing the interfitting protruding portions 13b can be reduced if the number of interfitting protruding portions 13b disposed at a uniform pitch is 3n, where n is an integer that is greater than or equal to one, and the number of poles is not 3m, where m is an even number that is greater than or equal to two.

Here, similar effects to those in Embodiment 1 above can be achieved if a driving apparatus-integrated permanent magnet motor in which the permanent magnet motor that uses the stator 1C according to Embodiment 5 is installed is mounted to a electric power steering apparatus.

Moreover, in Embodiment 5 above, the interfitting protruding portions 13b are disposed at strictly uniform spacing, but it goes without saying that it is not necessary for the arrangement of the interfitting protruding portions 13b to have strictly uniform spacing, and torque ripple-reducing effects can be obtained even if the spacing is nonuniform, and even if the spacing is approximately uniform, such as being disposed at positions that are offset by several degrees through ten degree, for example.

In Embodiment 5 above, the interfitting recess portions 13a are formed on the inner circumferential surface of the frame 4C, and the interfitting protruding portions 13b are formed on the outer circumferential surface of the core back 2a, but the interfitting protruding portions 13b may be formed on the inner circumferential surface of the frame 4C, and the interfitting recess portions 13a formed on the outer circumferential surface of the core back 2a.

Embodiment 6

Figure 26:
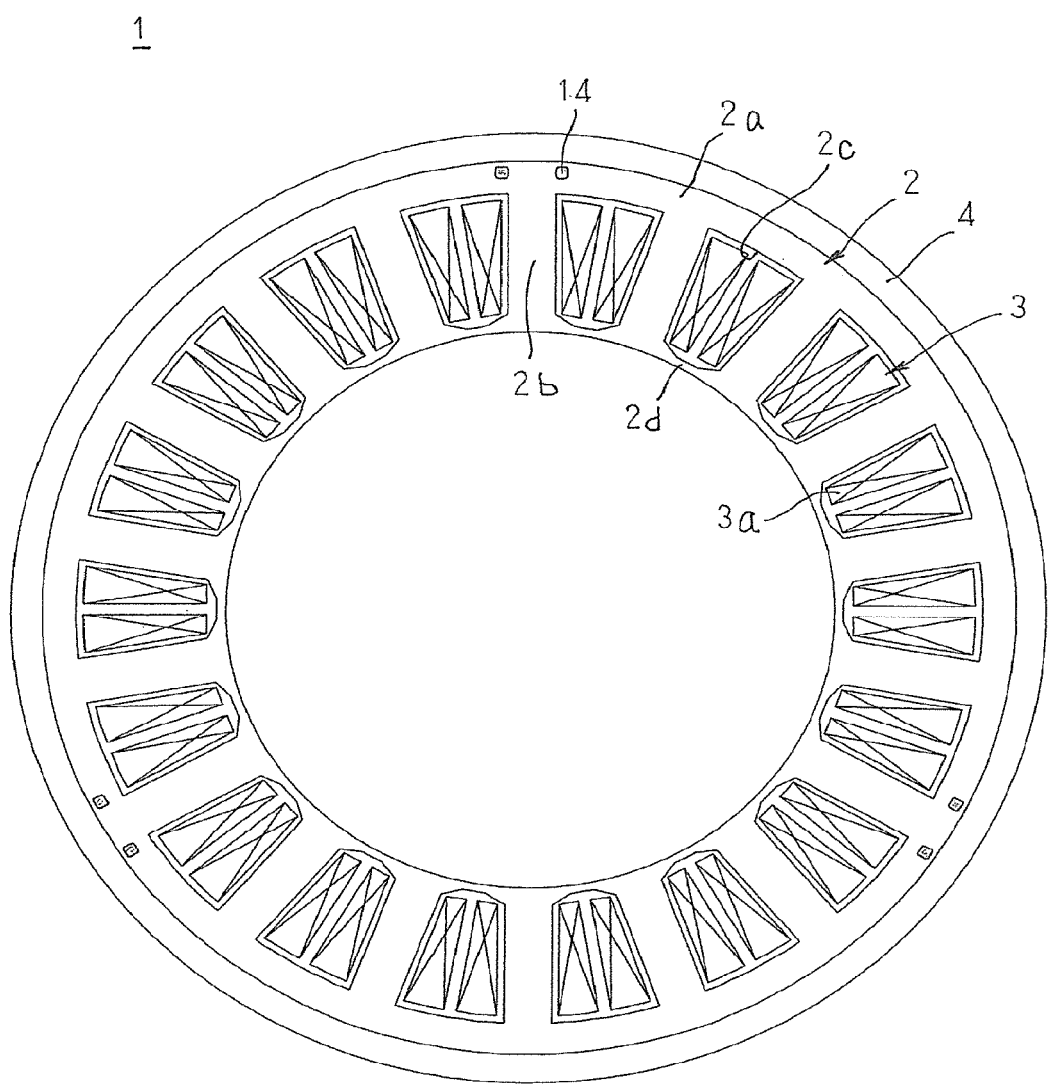
FIG. 26 is an end elevation that shows a stator in a permanent magnet motor according to Embodiment 6 of the present invention.
Figure 27:
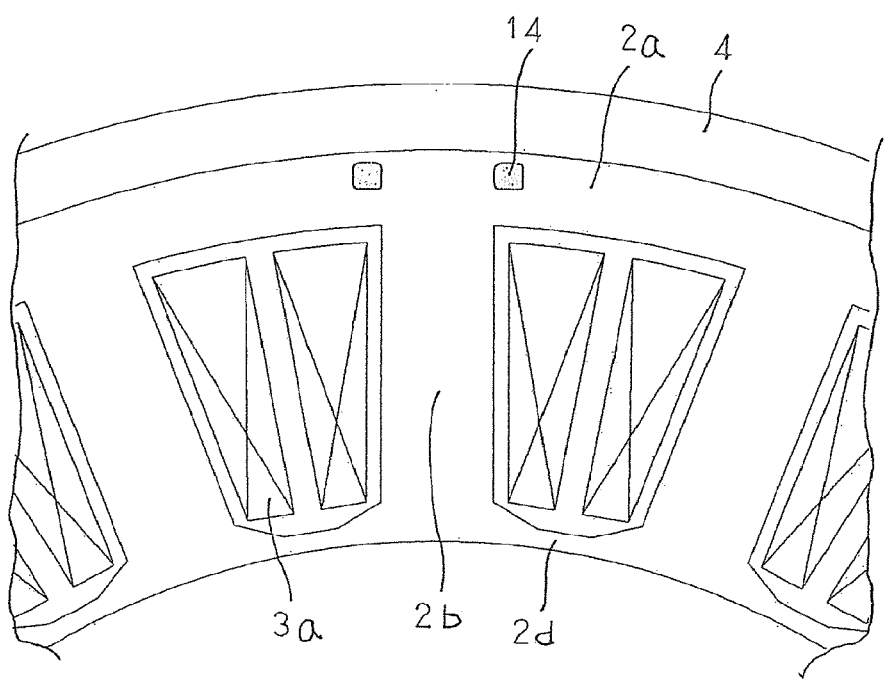
FIG. 27 is a partial end elevation that shows a vicinity of pressed portions of the stator in the permanent magnet motor according to Embodiment 6 of the present invention.

FIG. 26 is an end elevation that shows a stator in a permanent magnet motor according to Embodiment 6 of the present invention, and FIG. 27 is a partial end elevation that shows a vicinity of pressed portions of the stator in the permanent magnet motor according to Embodiment 6 of the present invention. Moreover, for simplicity, coils are represented in cross section in FIGS. 26 and 27.

In FIGS. 26 and 27, two pressed portions 14 each that function as plastically deformed portions are formed on respective portions of a core back 2a on outer circumferential sides of teeth 2b that are separated by 120 degrees. The pressed portions 14 are formed by pressing wedge-shaped pressing members against the core back 2a from axially outside after fixing a stator core 2 to a frame 4 by press-fitting or shrinkage fitting, for example.

Moreover, the rest of the configuration is formed in a similar or identical manner to that of Embodiment 1 above.

In a stator 1 according to Embodiment 6, the stator core 2 is fixed to the frame 4 by press-fitting or shrinkage fitting, and then the pressed portions 14 are formed by pressing the pressing members against the core back 2a from an axially outer side. Because the pressed portions 14 and portions in a vicinity thereof deform plastically thereby, and the core back 2a displaces radially outward, fastening force between the stator core 2 and the frame 4 is increased. Consequently, circumferential movement of the stator core 2 is prevented even if the fastening force between the frame 4 and the stator core 2 weakens at high temperatures.

In a permanent magnet motor according to Embodiment 6, because the pressed portions 14 are disposed on the core back 2a at three positions at intervals of 120 degrees circumferentially, imbalances also arise in the magnetic flux density and stress distribution in the stator core 2C as a result of disposing the pressed portions 14 on the core back 2a. The imbalances in the magnetic flux density and stress distribution have components that change in a third spatial order, but this permanent magnet motor has fourteen poles, making the number of poles different than an integral multiple of the number of pressed portions 14, which is three. In this case, the imbalances in magnetic flux density have negligible affect on torque ripples. Consequently, it is necessary to select the number of and spacing between the pressed portions 14 in response to the number of poles in the permanent magnet motor. If care is taken that the number of poles is an even number, then the influence on torque ripples due to disposing the pressed portions 14 can be reduced if the number of pressed portions 14 disposed at a uniform pitch is 3n, where n is an integer that is greater than or equal to one, and the number of poles is not 3m, where m is an even number that is greater than or equal to two.

Here, similar effects to those in Embodiment 1 above can be achieved if a driving apparatus-integrated permanent magnet motor in which the permanent magnet motor according to Embodiment 6 is installed is mounted to a electric power steering apparatus.

Moreover, in Embodiment 6 above, the pressed portions 14 are disposed at strictly uniform spacing, but it goes without saying that it is not necessary for the arrangement of the pressed portions 14 to have strictly uniform spacing, and torque ripple-reducing effects can be obtained even if the spacing is nonuniform, and even if the spacing is approximately uniform, such as being disposed at positions that are offset by several degrees through ten degree, for example.

Now, in Embodiments 1 through 6 above, permanent magnet motors in which the number of poles is fourteen and the number of slots is eighteen have been explained, but the present invention is not limited to permanent magnet motors the number of poles is fourteen and the number of slots is eighteen. Examples that have different numbers of poles and numbers of slots will be explained below.

Embodiment 7

Figure 28:
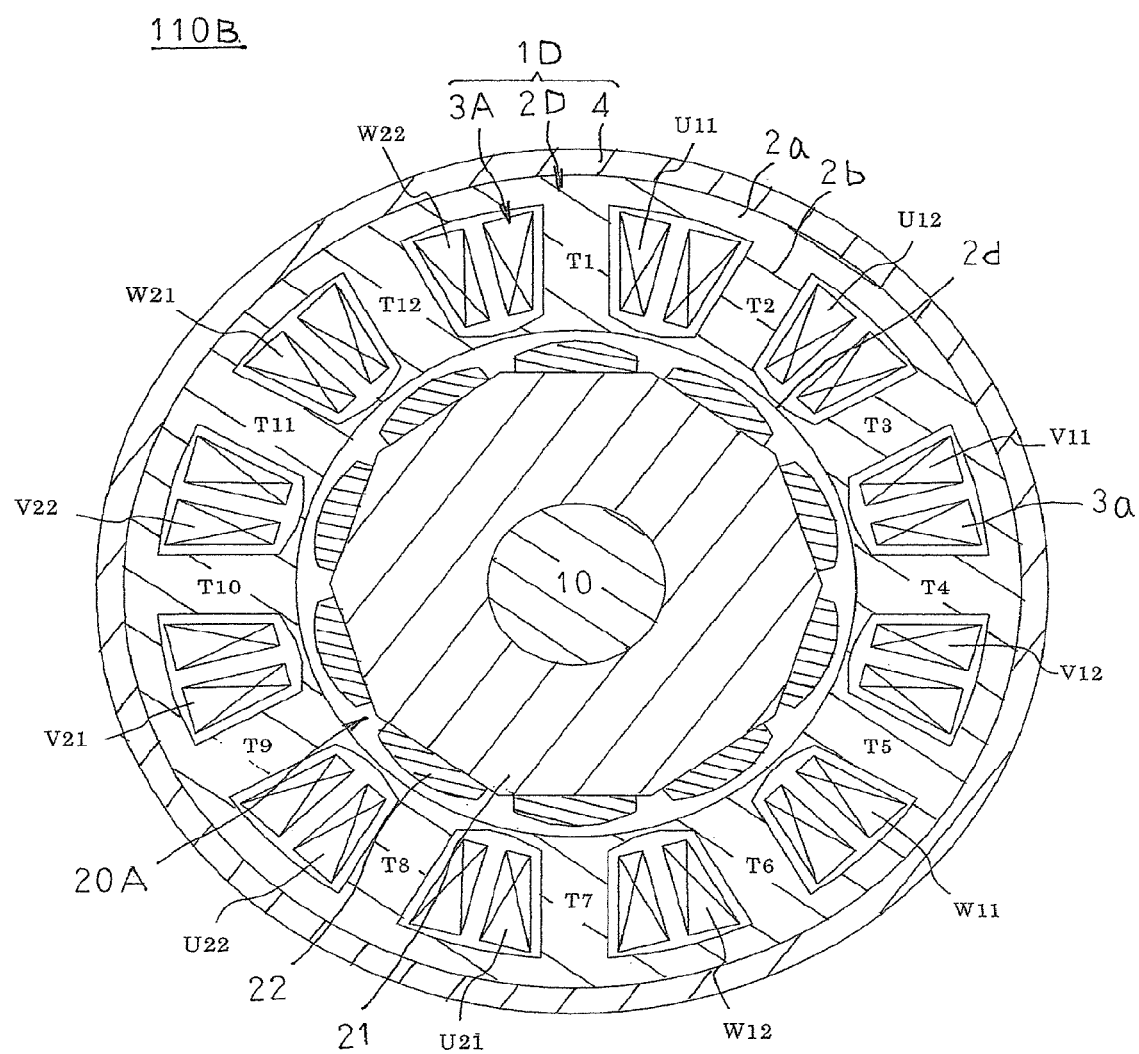
FIG. 28 is a lateral cross section that shows a permanent magnet motor according to Embodiment 7 of the present invention.

FIG. 28 is a lateral cross section that shows a permanent magnet motor according to Embodiment 7 of the present invention.

In FIG. 28, a permanent magnet motor 110B includes a stator 1D and a rotor 20A.

The stator 1D includes: a stator core 2D that has: an annular core back 2a; twelve teeth 2b that respectively protrude radially inward from an inner circumferential surface of the core back 2a and that are arranged at a uniform angular pitch circumferentially; and a connecting portion 2d that links together tip end portions of adjacent teeth 2b; an armature winding 3A that includes twelve coils 3a that are wound so as to be concentrated on each of the teeth 2b; and a frame 4 that holds the stator core 2D in an internally fitted state.

Moreover, in FIG. 28, insulators that are disposed between the armature winding 3A and the stator core 2D have been omitted for simplicity. Numbering T1 through T12 has also been allotted to the teeth 2b in order of circumferential arrangement for simplicity. Numbers are additionally applied to the coils 3a that are wound so as to be concentrated on each of the teeth 2b as an expedient so as to represent and identify which coil belongs to which phase among a U phase, a V phase, and a W phase. The U phase is constituted by four coils 3a, i.e., U11, U12, U21, and U22, the V phase is constituted by four coils 3a, i.e., V11, V12, V21, and V22, and the W phase is constituted by four coils 3a, i.e., W11, W12, W21, and W22. As shown in FIG. 28, the twelve coils 3a line up sequentially in order of U11, U12, V11, V12, W11, W12, U21, U22, V21, V22, W21, and W22 so as to correspond to each of the teeth T1 through T12.

The rotor 20A is a surface-magnet rotor that is configured such that ten permanent magnets 22 are disposed on an outer circumferential surface of the rotor core 21 at a uniform angular pitch.

In the permanent magnet motor 110B according to Embodiment 7, if a frame 4 that is produced using aluminum or an aluminum alloy such as ADC12 is used, similar or identical effects to those of the permanent magnet motor 110 in Embodiment 1 above can also be achieved. If dimensions of respective portions of the permanent magnet motor 110B are configured so as to satisfy $0.122 \leq (t2+t3)/r4 \leq 0.202$, for example, then reductions in size and increases in output can be achieved while also achieving reductions in vibration and noise. If the dimensions of the respective portions of the permanent magnet motor 110B are configured so as to satisfy $0.144 \leq (t2+t3)/r4 \leq 0.202$, then frame vibrational acceleration per unit torque can be further reduced. If the dimensions of the respective portions of the permanent magnet motor 110B are configured so as to satisfy $0.124 \leq (t2+t3)/r4 \leq 0.182$, then torque can be increased further. If the dimensions of the respective portions of the permanent magnet motor 110B are configured so as to satisfy $0.122 \leq (t2+t3)/r4 \leq 0.202$ and to satisfy $2\pi \cdot rout/(P \cdot t2) \leq 5.20$, then torque can be increased. In addition, if the dimensions of the respective portions of the permanent magnet motor 110B are configured so as to satisfy $0.0211 \leq P \cdot (t2+t3) \cdot t2/(2\pi \cdot rout \cdot r4) \leq 0.0874$, then motor output can be increased. If the dimensions of the respective portions of the permanent magnet motor 110B are configured so as to satisfy $0.025 \leq P \cdot (t2+t3) \cdot t2/(2\pi \cdot rout \cdot r4) \leq 0.0675$, then motor output can be further increased.

Because the number of poles is ten in the permanent magnet motor 110B according to Embodiment 7, and the number of slots is twelve, effects such as controllability being improved can be obtained because the greatest common divisor of the number of poles and the number of slots is two, the winding factor is 0.933, which is high, and the number of poles is also small. In addition, because the number of slots is twelve, which is less than the number of slots in the permanent magnet motor 110 in Embodiment 1, effects such as producibility of the armature winding 3A being improved can be obtained.

Here, similar effects to those in Embodiment 1 above can be achieved if a driving apparatus-integrated permanent magnet motor in which the permanent magnet motor 110B according to Embodiment 7 is installed is mounted to a electric power steering apparatus.

Moreover, in Embodiment 7 above, a rotor which permanent magnets are disposed on an outer circumferential surface of a rotor core has been used, but similar or identical effects can also be achieved if a rotor in which permanent magnets are disposed inside a rotor core is used.

Embodiment 8

Figure 29:
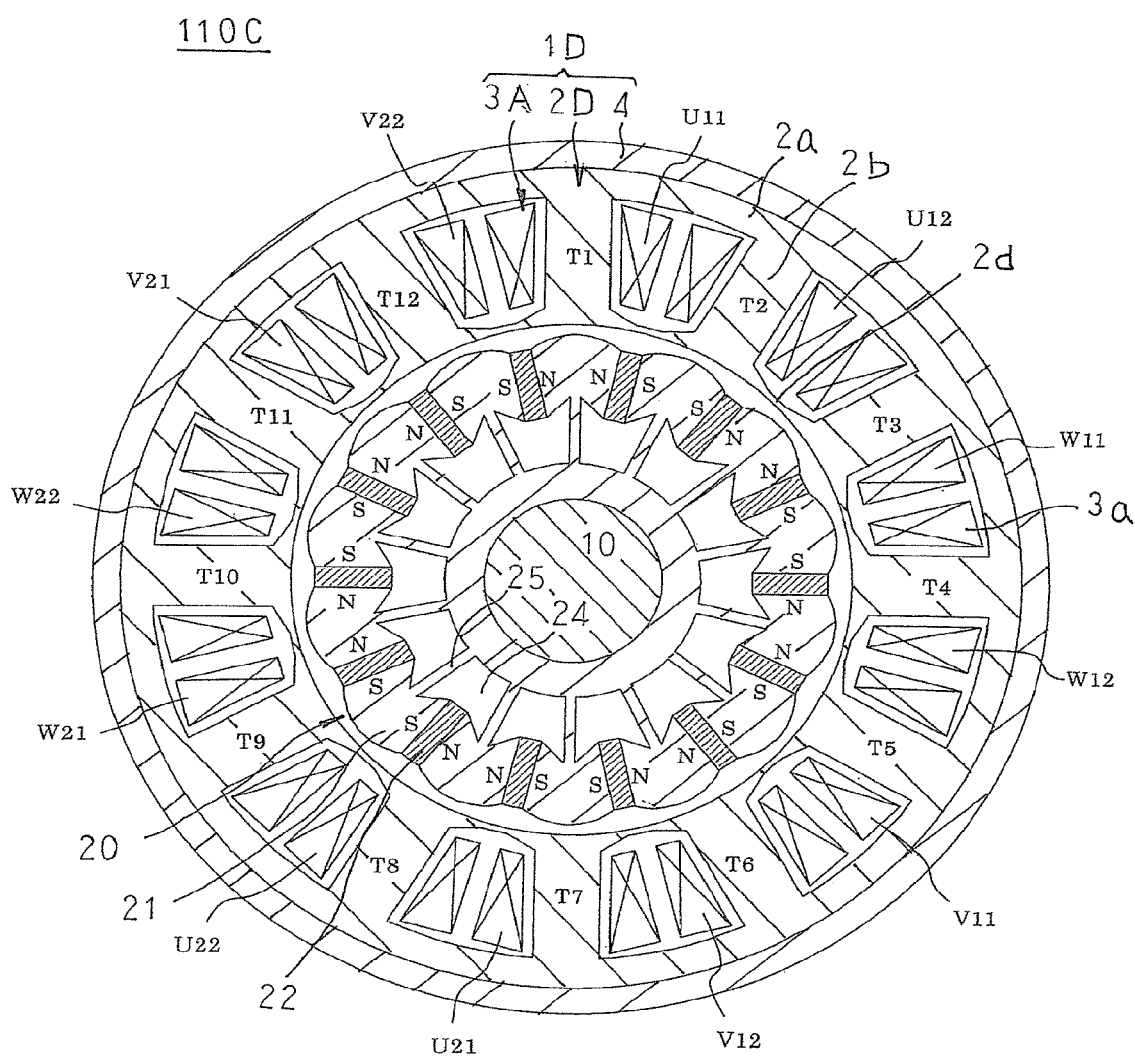
FIG. 29 is a lateral cross section that shows a permanent magnet motor according to Embodiment 8 of the present invention.

FIG. 29 is a lateral cross section that shows a permanent magnet motor according to Embodiment 8 of the present invention. Moreover, in FIG. 29, insulators that are disposed between the armature winding 3A and the stator core 2D have been omitted for simplicity. Numbering T1 through T12 has also been allotted to the teeth 2b in order of circumferential arrangement for simplicity. Numbers are additionally applied to the coils 3a that are wound so as to be concentrated on each of the teeth 2b as an expedient so as to represent and identify which coil belongs to which phase among a U phase, a V phase, and a W phase.

In FIG. 29, a permanent magnet motor 110C includes a stator 1D and a rotor 20. Moreover, because the configuration of the stator 1D has been explained in Embodiment 7, and the configuration of the rotor 20 has been explained in Embodiment 1, explanation thereof will be omitted here.

In the permanent magnet motor 110C according to Embodiment 8, if a frame 4 that is produced using aluminum or an aluminum alloy such as ADC12 is used, similar or identical effects to those of the permanent magnet motor 110 in Embodiment 1 above can also be achieved. If dimensions of respective portions of the permanent magnet motor 110C are configured so as to satisfy $0.122 \leq (t2+t3)/r4 \leq 0.202$, for example, then reductions in size and increases in output can be achieved while also achieving reductions in vibration and noise. If the dimensions of the respective portions of the permanent magnet motor 110C are configured so as to satisfy $0.144 \leq (t2+t3)/r4 \leq 0.202$, then frame vibrational acceleration per unit torque can be further reduced. If the dimensions of the respective portions of the permanent magnet motor 110C are configured so as to satisfy $0.124 \leq (t2+t3)/r4 \leq 0.182$, then torque can be increased further. If the dimensions of the respective portions of the permanent magnet motor 110C are configured so as to satisfy $0.122 \leq (t2+t3)/r4 \leq 0.202$ and to satisfy $2\pi \cdot rout/(P \cdot t2) \leq 5.20$, then torque can be increased. In addition, if the dimensions of the respective portions of the permanent magnet motor 110C are configured so as to satisfy $0.0211 \leq P \cdot (t2+t3) \cdot t2/(2\pi \cdot rout \cdot r4) \leq 0.0874$, then motor output can be increased. If the dimensions of the respective portions of the permanent magnet motor 110C are configured so as to satisfy $0.025 \leq P \cdot (t2+t3) \cdot t2/(2\pi \cdot rout \cdot r4) \leq 0.0675$, then motor output can be further increased.

Because the number of poles is fourteen in the permanent magnet motor 110C according to Embodiment 8, and the number of slots is twelve, the greatest common divisor of the number of poles and the number of slots is two, and the winding factor is 0.933, which is high, and in addition, because the number of slots is twelve, which is less than the number of slots in the permanent magnet motor 110 in Embodiment 1, effects such as producibility of the armature winding 3A being improved can be obtained.

Here, similar effects to those in Embodiment 1 above can be achieved if a driving apparatus-integrated permanent magnet motor in which the permanent magnet motor 110C according to Embodiment 8 is installed is mounted to a electric power steering apparatus.

Moreover, in Embodiment 8 above, a rotor which permanent magnets are disposed inside a rotor core has been used, but similar or identical effects can also be achieved if a rotor in which permanent magnets are disposed on an outer circumferential surface of a rotor core is used.

Embodiment 9

Figure 30:
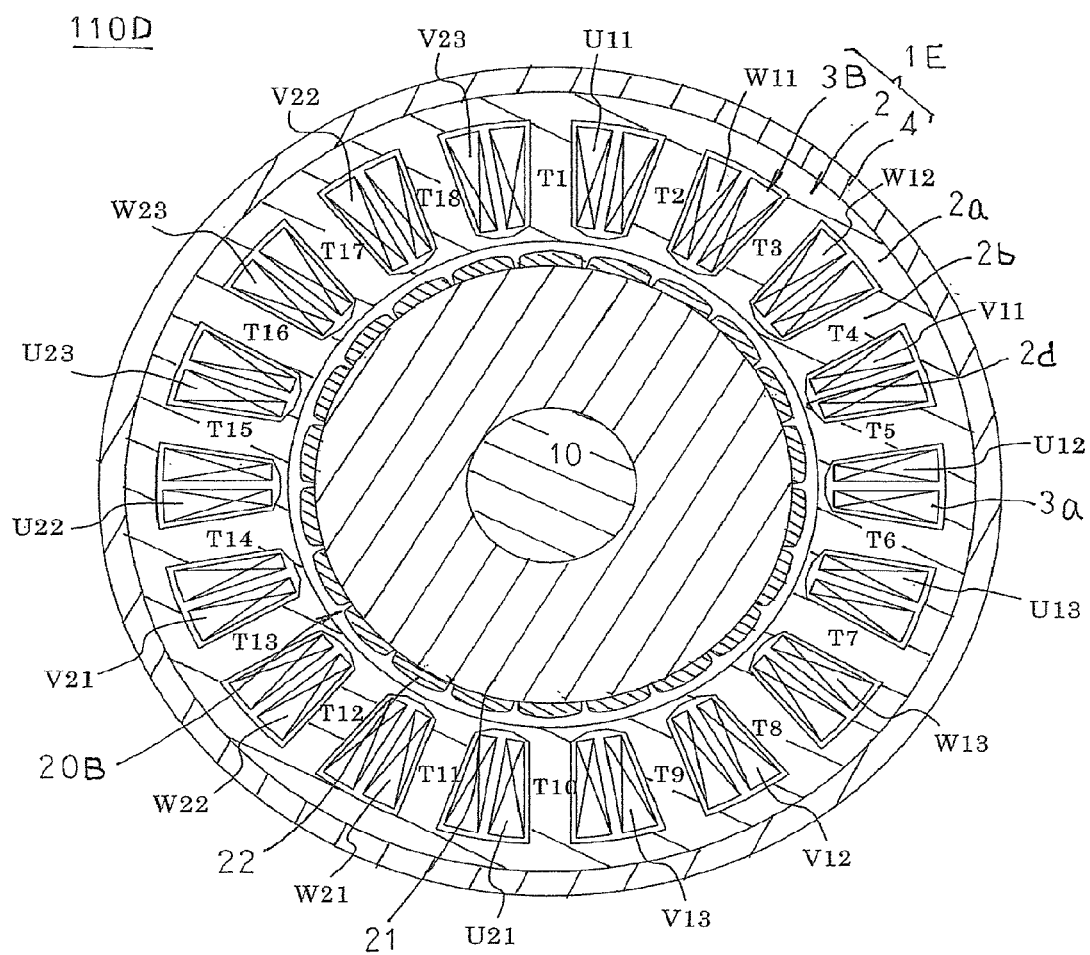
FIG. 30 is a lateral cross section that shows a permanent magnet motor according to Embodiment 9 of the present invention.

FIG. 30 is a lateral cross section that shows a permanent magnet motor according to Embodiment 9 of the present invention.

In FIG. 30, a permanent magnet motor 110D includes a stator 1E and a rotor 20B.

The stator 1E includes: a stator core 2D that has: an annular core back 2a; eighteen teeth 2b that respectively protrude radially inward from an inner circumferential surface of the core back 2a and that are arranged at a uniform angular pitch circumferentially; and a connecting portion 2d that links together tip end portions of adjacent teeth 2b; an armature winding 3B that includes eighteen coils 3a that are wound so as to be concentrated on each of the teeth 2b; and a frame 4 that holds the stator core 2D in an internally fitted state.

Moreover, in FIG. 30, insulators that are disposed between the armature winding 3B and the stator core 2 have been omitted for simplicity. Numbering T1 through T18 has also been allotted to the teeth 2b in order of circumferential arrangement for simplicity. Numbers are additionally applied to the coils 3a that are wound so as to be concentrated on each of the teeth 2b as an expedient so as to represent and identify which coil belongs to which phase among a U phase, a V phase, and a W phase. The U phase is constituted by six coils 3a, i.e., U11, U12, U13, U21, U22, and U23, the V phase is constituted by six coils 3a, i.e., V11, V12, V13, V21, V22, and V23, and the W phase is constituted by six coils 3a, i.e., W11, W12, W13, W21, W22, and W23. As shown in FIG. 28, the eighteen coils 3a line up sequentially in order of U11, W11, W12, V11, U12, U13, W13, V12, V13, U21, W21, W22, V21, U22, U23, W23, V22, and V23 so as to correspond to each of the teeth T1 through T18.

Thus, the stator 1E is configured in a similar or identical manner to that of the stator 1 in Embodiment 1 except that the circumferential sequential order of the coils 3a that constitute the armature winding 3B is different.

The rotor 20B is a surface-magnet rotor that is configured such that twenty-two permanent magnets 22 are disposed on an outer circumferential surface of the rotor core 2 at a uniform angular pitch circumferentially.

In the permanent magnet motor 110D according to Embodiment 9, if a frame 4 that is produced using aluminum or an aluminum alloy such as ADC12 is used, similar or identical effects to those of the permanent magnet motor 110 in Embodiment 1 above can also be achieved. If dimensions of respective portions of the permanent magnet motor 110D are configured so as to satisfy $0.122 \leq (t2+t3)/r4 \leq 0.202$, for example, then reductions in size and increases in output can be achieved while also achieving reductions in vibration and noise. If the dimensions of the respective portions of the permanent magnet motor 110D are configured so as to satisfy $0.144 \leq (t2+t3)/r4 \leq 0.202$, then frame vibrational acceleration per unit torque can be further reduced. If the dimensions of the respective portions of the permanent magnet motor 110D are configured so as to satisfy $0.124 \leq (t2+t3)/r4 \leq 0.182$, then torque can be increased further. If the dimensions of the respective portions of the permanent magnet motor 110D are configured so as to satisfy $0.122 \leq (t2+t3)/r4 \leq 0.202$ and to satisfy $2\pi \cdot \text{rout}/(P \cdot t2) \leq 5.20$, then torque can be increased. In addition, if the dimensions of the respective portions of the permanent magnet motor 110D are configured so as to satisfy $0.0211 \leq P \cdot (t2+t3) \cdot t2/(2\pi \cdot \text{rout} \cdot r4) \leq 0.0874$, then motor output can be increased. If the dimensions of the respective portions of the permanent magnet motor 110D are configured so as to satisfy $0.025 \leq P \cdot (t2+t3) \cdot t2/(2\pi \cdot \text{rout} \cdot r4) \leq 0.0675$, then motor output can be further increased.

Because the number of poles in the permanent magnet motor 110D according to Embodiment 9 is twenty-two, and the number of slots is eighteen, the greatest common divisor of the number of poles and the number of slots is two, generating electromagnetic vibrational forces in the second order spatial mode. However, by disposing the eighteen coils 3a as shown in FIG. 30, the electromagnetic vibrational forces in the second order spatial mode can be reduced equally to the permanent magnet motor 110 in Embodiment 1, enabling low vibration and low noise to be achieved.

Here, similar effects to those in Embodiment 1 above can be achieved if a driving apparatus-integrated permanent magnet motor in which the permanent magnet motor 110D according to Embodiment 9 is installed is mounted to a electric power steering apparatus.

Moreover, in Embodiment 9 above, a rotor which permanent magnets are disposed on an outer circumferential surface of a rotor core has been used, but similar or identical effects can also be achieved if a rotor in which permanent magnets are disposed inside a rotor core is used.

Embodiment 10

Figure 31:
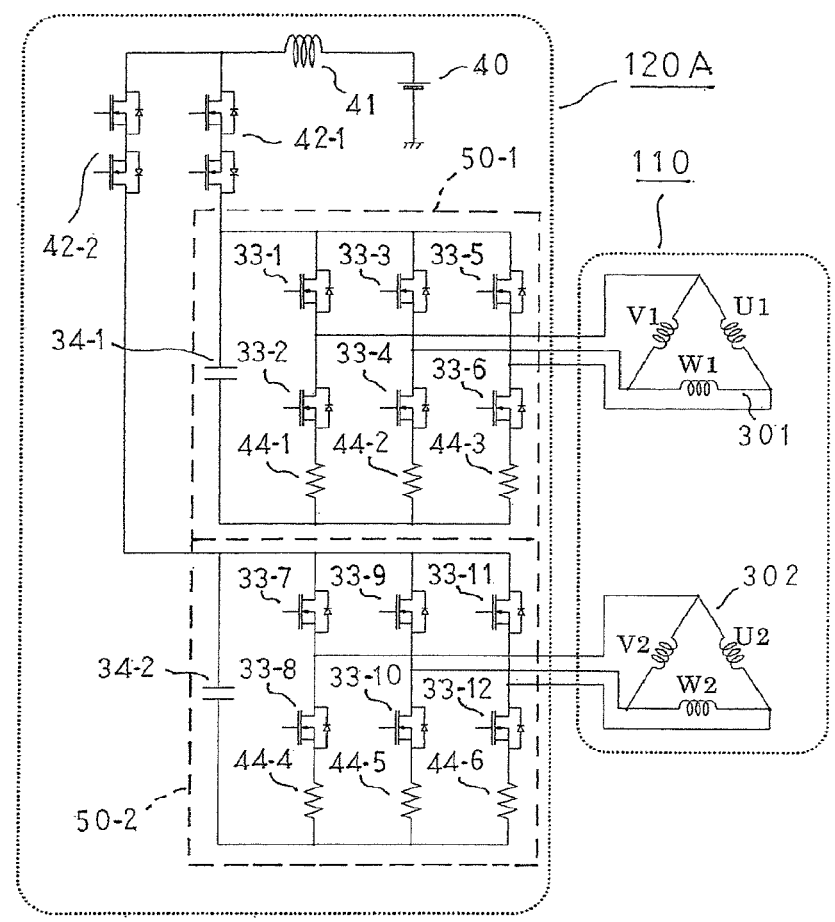
FIG. 31 is a circuit diagram for a driving apparatus-integrated permanent magnet motor according to Embodiment 10 of the present invention.

FIG. 31 is a circuit diagram for a driving apparatus-integrated permanent magnet motor according to Embodiment 10 of the present invention. Moreover, in FIG. 31, for simplicity, only an armature winding of a permanent magnet motor 110 is depicted, and only a power circuit portion of an inverter of an ECU portion 120A is shown.

In FIG. 31, a permanent magnet motor 110 is a motor in which the number of poles is fourteen, and the number of slots is eighteen. An armature winding 3 of the permanent magnet motor 110 is constituted by: a first armature winding 301 that is configured by delta-connecting a first U-phase winding U1, a first V-phase winding V1, and a first W-phase winding W1; and a second armature winding 302 that is configured by delta-connecting a second U-phase winding U2, a second V-phase winding V2, and a second W-phase winding W2.

The ECU portion 120A is constituted by first and second inverter circuits 50-1 and 50-2, and three-phase electric current is supplied to the first and second armature windings 301 and 302 from each of the first and second inverter circuits 50-1 and 50-2.

Direct-current power is supplied to the ECU portion 120A from a direct-current power supply 40 such as a battery, and first and second electric power supply relays 42-1 and 42-2 are connected thereto so as to have a noise reduction coil 41 interposed. In FIG. 31, the direct-current power supply 40 is depicted as if it were inside the ECU portion 120A, but in fact electric power is supplied from an external direct-current power supply 40 such as a battery, etc., through an electric power supply connector. The first and second electric power supply relays 42-1 and 42-2 are each constituted by two MOSFETs, and operate such that the first and second electric power supply relays 42-1 and 42-2 open during failure to prevent excessive electric current from flowing. Moreover, in FIG. 31, connection is made sequentially in order of the direct-current power supply 40, the coil 41, and the first and second electric power supply relays 42-1 and 42-2, but the first and second electric power supply relays 42-1 and 42-2 may be disposed at positions that are closer to the direct-current power supply 40 than the coil 41. First and second capacitors 34-1 and 34-2 are smoothing capacitors. The first and second capacitors 34-1 and 34-2 are each constituted by a single capacitor, but may be configured by connecting a plurality of capacitors in parallel.

The first inverter circuit 50-1 is constituted by a bridge that uses six switching elements 33-1 through 33-6. Specifically, the first inverter circuit 50-1 is configured by connecting in parallel a pair of switching elements 33-1 and 33-2, a pair of switching elements 33-3 and 33-4, and a pair of switching elements 33-5 and 33-6 that are respectively connected in series. In addition, shunt resistors 44-1, 44-2, and 44-3 are respectively connected to ground (GND) ends of the pair of switching elements 33-1 and 33-2, the pair of switching elements 33-3 and 33-4, and the pair of switching elements 33-5 and 33-6 that are connected in series. These shunt resistors 44-1, 44-2, and 44-3 are used to detect values of electric current.

The second inverter circuit 50-2 is constituted by a bridge that uses six switching elements 33-7 through 33-12. Specifically, the second inverter circuit 50-2 is configured by connecting in parallel a pair of switching elements 33-7 and 33-8, a pair of switching elements 33-9 and 33-10, and a pair of switching elements 33-11 and 33-12 that are respectively connected in series. In addition, shunt resistors 44-4, 44-5, and 44-6 are respectively connected to ground (GND) ends of the pair of switching elements 33-7 and 33-8, the pair of switching elements 33-9 and 33-10, and the pair of switching elements 33-11 and 33-12 that are connected in series. These shunt resistors 44-4, 44-5, and 44-6 are used to detect values of electric current.

Now, three shunt resistors 44-1 through 44-6 are used in each of the first and second inverter circuits 50-1 and 50-2, but because an electric current value can be detected even using a single shunt resistor in each, the number of shunt resistors is not limited to three.

Electric current to the armature winding 3 is supplied from between the switching elements 33-1 and 33-2 through busbars, etc., to a connection portion between the U1 phase and the V1 phase of the first armature winding 301, from between the switching elements 33-3 and 33-4 through busbars, etc., to a connection portion between the V1 phase and the W1 phase of the first armature winding 301, and from a connection portion between the switching elements 33-5 and 33-6 through busbars, etc., to a connection portion between the W1 phase and the U1 phase of the first armature winding 301, and is supplied from between the switching elements 33-7 and 33-8 through busbars, etc., to a connection portion between the U2 phase and the V2 phase of the second armature winding 302, from between the switching elements 33-9 and 33-10 through busbars, etc., to a connection portion between the V2 phase and the W2 phase of the second armature winding 302, and from a connection portion between the switching elements 33-11 and 33-12 through busbars, etc., to a connection portion between the W2 phase and the U2 phase of the second armature winding 302.

The first and second inverter circuits 50-1 and 50-2 are switched by sending signals to the twelve switching elements 33-1 through 33-12 from a controlling circuit (not shown) in response to the angle of rotation that is detected by a rotational angle sensor (not shown) that is included in the permanent magnet motor 110 to supply a desired three-phase electric current to the first and second armature windings 301 and 302. Moreover, a resolver, a giant magnetoresistive (GMR) sensor, or a magnetoresistive (MR) sensor, etc., can be used for the rotational angle sensor.

In a driving apparatus-integrated permanent magnet motor 100A that is configured in this manner, first and second armature windings 301 and 302 are driven using first and second inverter circuits 50-1 and 50-2. Thus, torque ripples can be significantly reduced by changing the phase of the electric current that the first and second inverter circuits 50-1 and 50-2 supply. Torque ripples in a sixty-electrical-degree period can also be canceled out by offsetting the phase of the electric current of the first and second inverter circuits 50-1 and 50-2 by thirty electrical degrees. Consequently, the driving apparatus-integrated permanent magnet motor 100A can achieve effects that enable torque ripples to be reduced significantly.

In an electric power steering apparatus 500, because torque ripples may degrade the steering experience if the torque ripples are felt by a driver, in addition to causing vibration and noise, effects can be obtained by mounting the driving apparatus-integrated permanent magnet motor 100A that reduce vibration noise, to enable a superior steering experience.

Moreover, in Embodiment 10 above, the permanent magnet motor 110 has been explained as being used in Embodiment 1, but it goes without saying that the permanent magnet motor may be used in other embodiments.

The invention claimed is:

1. A permanent magnet motor comprising:
   a stator comprising:
      a stator core in which teeth are respectively arranged circumferentially so as to protrude radially inward from an annular core back;
      an armature winding that is mounted to said stator core; and
      a frame that holds said stator core in an internally fitted state; and
   a rotor that comprises a rotor core and permanent magnets;
   said armature winding being constituted by a plurality of coils that are respectively wound to be concentrated on said teeth,
   wherein:
   inner circumferential ends of adjacent teeth are connected together by a connecting portion;
   said frame is produced using aluminum or an aluminum alloy; and
   $0.122 \leq (t2+t3)/r4 \leq 0.202$ is satisfied, and $1.00 \leq t2/t3 \leq 1.75$ is satisfied, where t2 is a thickness of said core back, t3 is a thickness of said frame, and r4 is an outside radius of said frame.

2. The permanent magnet motor according to claim 1, wherein $0.144 \leq (t2+t3)/r4 \leq 0.202$ is satisfied.

3. The permanent magnet motor according to claim 1, wherein $2\pi \cdot \text{rout}/(P \cdot t2) \leq 5.20$ is satisfied, where rout is an outside radius of said rotor, and P is a number of poles in said rotor.

4. The permanent magnet motor according to claim 1, wherein $0.0211 \leq P \cdot (t2+t3) \cdot t2/(2\pi \cdot \text{rout} \cdot r4) \leq 0.0874$ is satisfied, where rout is an outside radius of said rotor, and P is a number of poles in said rotor.

5. The permanent magnet motor according to claim 1, wherein:
said stator core is configured by laminating steel sheets that have a sheet thickness tc;
$0.5 \leq t0/tc \leq 2.0$ is satisfied, where t0 is a radial thickness of said connecting portion.

6. The permanent magnet motor according to claim 1, wherein said stator core is configured to be divided into:
an outer core that comprises said core back; and
an inner core that comprises said teeth and said connecting portion.

7. The permanent magnet motor according to claim 6, further comprising coil bodies that are mounted to said teeth,
said coil bodies being configured by winding said coils onto tubular insulators that are mounted to said teeth in an externally fitted state.

8. The permanent magnet motor according to claim 1, wherein said core back is formed such that, in a plane that is perpendicular to a central axis of said stator core, an outer circumference is a circle that is centered around said central axis, and an inner circumference is a circular arc that is centered around said central axis.

9. The permanent magnet motor according to claim 1, wherein:
notch portions are respectively disposed on an outer circumferential surface of said core back at 3n positions at a uniform spacing circumferentially, to be each disposed at circumferentially central portions of said teeth, where n is an integer that is greater than or equal to 1; and
a number of poles P in said rotor is different than 3m, where m is an integer that is greater than or equal to 2.

10. The permanent magnet motor according to claim 1, wherein said connecting portion is disposed partially in an axial direction.

11. The permanent magnet motor according to claim 1, wherein:
an interfitting recess portion is formed on a first of an inner circumferential surface of said frame and an outer circumferential surface of said core back;
an interfitting protruding portion is formed on a second of said inner circumferential surface of said frame and said outer circumferential surface of said core back; and
said stator core is held on said frame by fitting together said interfitting recess portion and said interfitting protruding portion.

12. The permanent magnet motor according to claim 1, wherein a number of poles in said rotor is fourteen, and a number of slots is eighteen.

13. A driving apparatus-integrated permanent magnet motor comprising:
said management magnet motor according to claim 12; and
an electronic control unit (ECU) portion that comprises:
switching elements that supply electric current to said armature winding; and
a heatsink on which said switching elements are disposed,
said ECU portion being configured integrally with said permanent magnet motor by fitting said heatsink together with said frame so as to be disposed so as to be coaxial to said permanent magnet motor.

14. The driving apparatus-integrated permanent magnet motor according to claim 13, wherein:
said armature winding is constituted by:
a first armature winding that is formed by alternating-current connecting a portion of said plurality of coils; and
a second armature winding that is formed by alternating-current connecting a remaining portion of said plurality of coils; and
said ECU portion comprises:
a first inverter circuit that drives said first armature winding; and
a second inverter circuit that drives said second armature winding,
said first and second inverter circuits each being constituted by said switching elements.

15. The driving apparatus-integrated permanent magnet motor according to claim 13, wherein said permanent magnet motor is mounted to an electric power steering apparatus such that an axial direction of said permanent magnet motor is parallel to a direction of movement of a rack shaft of said electric power steering apparatus.

16. The permanent magnet motor according to claim 1, wherein a number of poles in said rotor is ten, and a number of slots is twelve.

17. A driving apparatus-integrated permanent magnet motor comprising:
said permanent magnet motor according to claim 16; and
an electronic control unit (ECU) portion that comprises:
switching elements that supply electric current to said armature winding; and
a heatsink on which said switching elements are disposed,
said ECU portion being configured integrally with said permanent magnet motor by fitting said heatsink together with said frame so as to be disposed so as to be coaxial to said permanent magnet motor.

18. A manufacturing method for a permanent magnet motor comprising:
a stator comprising:
a stator core in which teeth are respectively arranged circumferentially so as to protrude radially inward from an annular core back;
an armature winding that is mounted to said stator core; and
a frame that holds said stator core in an internally fitted state; and
a rotor that comprises a rotor core and permanent magnets,
said armature winding being constituted by a plurality of coils that are respectively wound to be concentrated on said teeth,
wherein:
inner circumferential ends of adjacent teeth are connected together by a connecting portion;
said frame is produced using aluminum or an aluminum alloy;
$0.122 \leq (t2+t3)/r4 \leq 0.202$ is satisfied, and $1.00 \leq t2/t3 \leq 1.75$ is satisfied, where t2 is a thickness of said core back, t3 is a thickness of said frame, and r4 is an outside radius of said frame; and
at least one plastically deformed portion that is formed by pressing from an axially outer side is disposed in a circumferential direction on an axial end surface of said core back,
said deformed portion being formed by deforming said core back toward a radially outer side by pressing from said axially outer side on said axial end surface of said core back, after said stator core is fixed to said frame.

* * * * *